United States Patent
Lampaert et al.

(10) Patent No.: US 11,261,912 B2
(45) Date of Patent: Mar. 1, 2022

(54) LUBRICATED SLIDING BEARING WITH ADJUSTMENT OF THE PROPERTIES OF THE LUBRICANT IN CERTAIN PARTS OF THE BEARING GAP

(71) Applicant: Bifröst Research and Development B.V., Wijk Bij Duurstede (NL)

(72) Inventors: Stefan George Emile Lampaert, Delft (NL); Ronald Adrianus Johannes Van Ostayen, Delft (NL)

(73) Assignee: BIFRÖST RESEARCH AND DEVELOPMENT B.V., Wijk bij Duurstede (NL)

( * ) Notice: Subject to any disclaimer, the term of this patent is extended or adjusted under 35 U.S.C. 154(b) by 120 days.

(21) Appl. No.: 16/614,285

(22) PCT Filed: May 18, 2018

(86) PCT No.: PCT/NL2018/050330
§ 371 (c)(1),
(2) Date: Nov. 15, 2019

(87) PCT Pub. No.: WO2018/212657
PCT Pub. Date: Nov. 22, 2018

(65) Prior Publication Data
US 2020/0149588 A1    May 14, 2020

(30) Foreign Application Priority Data

May 19, 2017    (NL) ...................................... 2018947

(51) Int. Cl.
*F16C 33/10*    (2006.01)
*F16C 17/02*    (2006.01)
*F16C 17/04*    (2006.01)

(52) U.S. Cl.
CPC .......... *F16C 33/109* (2013.01); *F16C 33/106* (2013.01); *F16C 17/02* (2013.01);
(Continued)

(58) Field of Classification Search
CPC ........ F16C 17/02; F16C 17/026; F16C 17/04; F16C 17/045; F16C 17/10; F16C 17/102;
(Continued)

(56) References Cited

U.S. PATENT DOCUMENTS

| 5,772,335 A | 6/1998 | Miller |
| 2010/0224163 A1 | 9/2010 | O'Neill et al. |

(Continued)

FOREIGN PATENT DOCUMENTS

| CN | 2436714 Y | 6/2001 |
| CN | 101737272 A | 6/2010 |

(Continued)

OTHER PUBLICATIONS

International Search Report and Written Opinion dated Aug. 9, 2018 for Application No. PCT/NL2018/050330.

(Continued)

*Primary Examiner* — Alan B Waits
(74) *Attorney, Agent, or Firm* — Patterson & Sheridan, L.L.P.

(57) ABSTRACT

The invention relates to a bearing device comprising a first surface and a second surface which are moveable relative to one another, wherein the first and second surfaces are separated by a bearing gap filled with a lubricant, which is a magnetorheological or electrorheological liquid, or a lubricant having a temperature dependent viscosity, or a lubricant having a controllable slip velocity. The bearing device further comprising one or more supply inlets in the first or second surface, and one or more activators embedded in the first surface or second surface and configured to locally (Continued)

increase a viscosity or decrease the slip velocity of the lubricant in at least one obstruction zone, thereby inhibiting a flow of the lubricant in the obstruction zone.

15 Claims, 18 Drawing Sheets

(52) U.S. Cl.
CPC ............ *F16C 17/04* (2013.01); *F16C 33/103* (2013.01); *F16C 2210/04* (2013.01)

(58) Field of Classification Search
CPC .... F16C 17/105; F16C 17/107; F16C 33/106; F16C 33/109; F16C 2210/04; F16C 33/1025–1085; F16C 33/103
See application file for complete search history.

(56) References Cited

U.S. PATENT DOCUMENTS

| | | | | |
|---|---|---|---|---|
| 2010/0284637 | A1* | 11/2010 | Sentmanat | F16C 33/103 384/100 |
| 2011/0303491 | A1 | 12/2011 | Jenkins | |
| 2014/0072250 | A1* | 3/2014 | Kern | F16C 32/0637 384/119 |

FOREIGN PATENT DOCUMENTS

| | | | | |
|---|---|---|---|---|
| CN | 102066718 | A | 5/2011 | |
| CN | 202598074 | U | 12/2012 | |
| CN | 103109103 | A | 5/2013 | |
| CN | 104169596 | A | 11/2014 | |
| DE | 19826519 | A1 | 12/1999 | |
| DE | 102010019285 | A1 | 11/2011 | |
| DE | 102012213497 | A1 * | 2/2014 | ............ F16C 37/002 |
| DE | 102012213497 | A1 | 2/2014 | |
| DE | 102015211319 | A1 | 12/2016 | |
| EP | 2840267 | A1 | 2/2015 | |
| EP | 3109469 | A1 | 12/2016 | |
| JP | 03024316 | A * | 2/1991 | .......... F16C 32/0644 |
| JP | H0324316 | A | 2/1991 | |
| JP | 07217656 | A * | 8/1995 | .......... F16C 32/0677 |
| JP | H0835522 | A | 2/1996 | |
| JP | 2016161060 | A | 9/2016 | |
| JP | 2017057748 | A | 3/2017 | |

OTHER PUBLICATIONS

Search Report dated Apr. 11, 2018 for Application No. NL 2018947.
Chinese Office Action dated Dec. 2, 2020, corresponding to Application No. 201880033135.4.

* cited by examiner

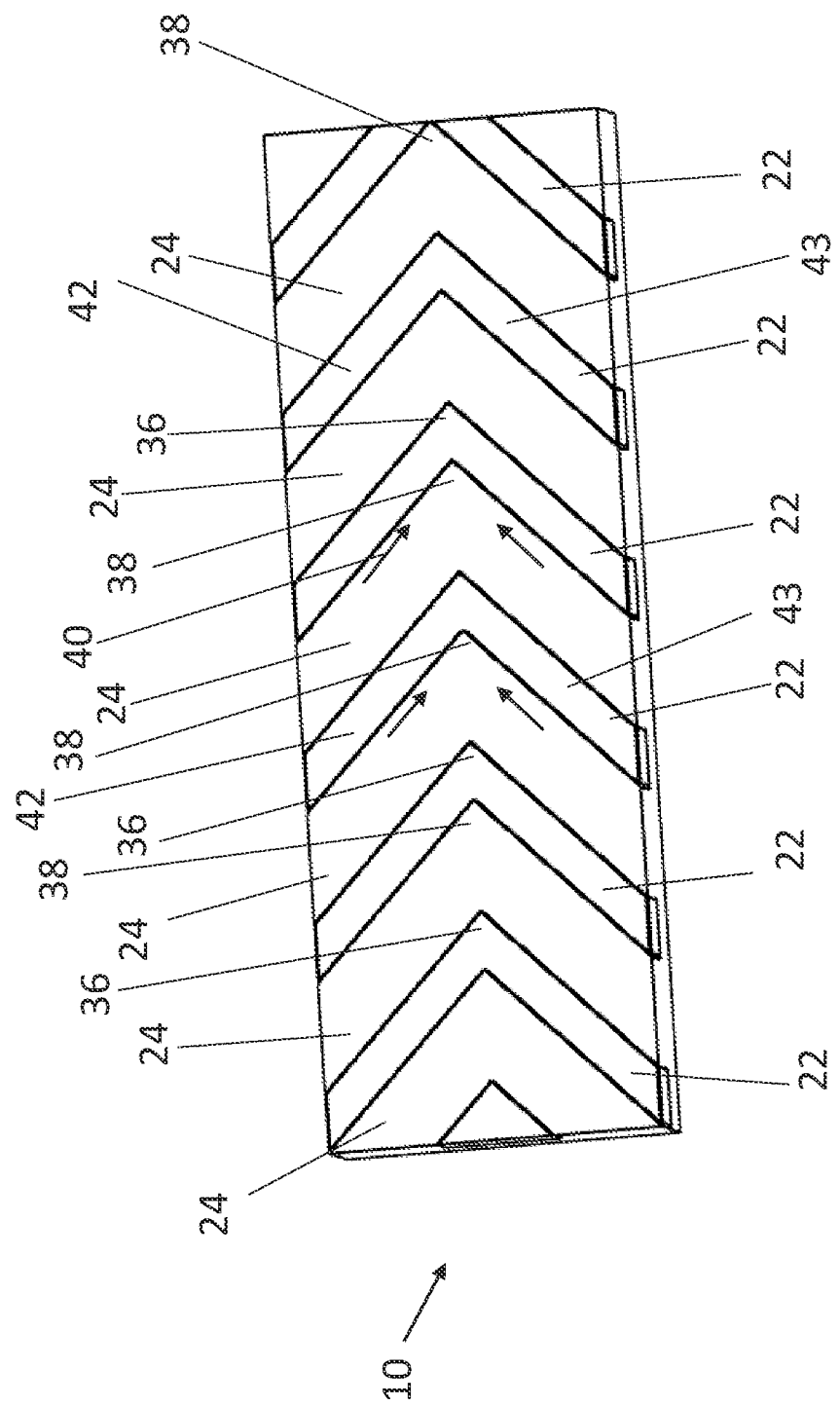

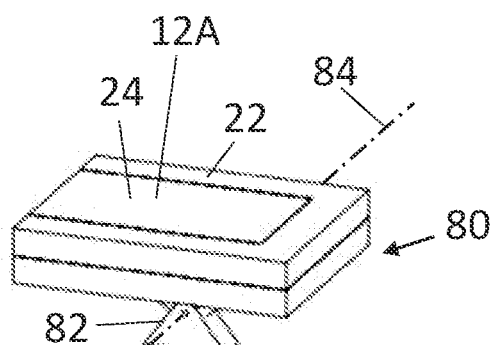
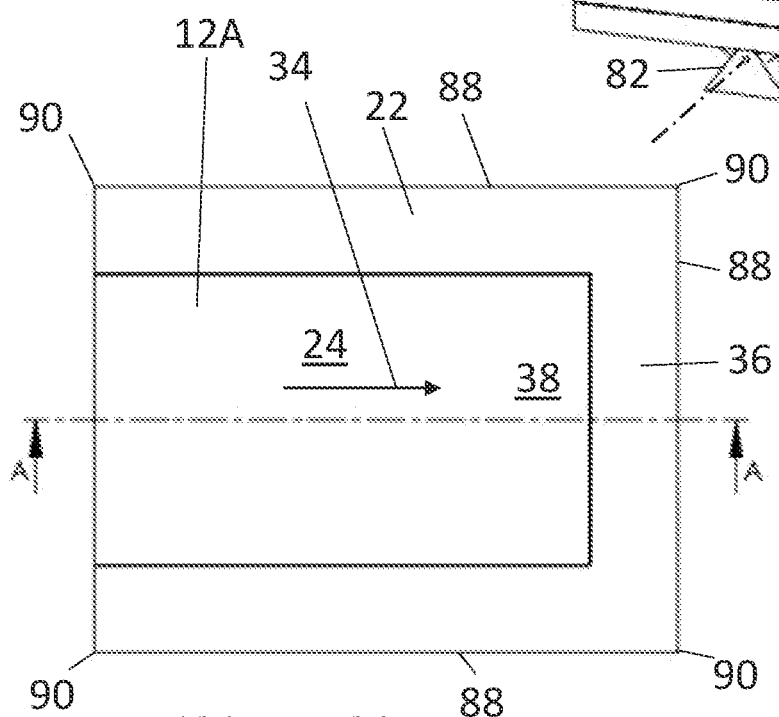
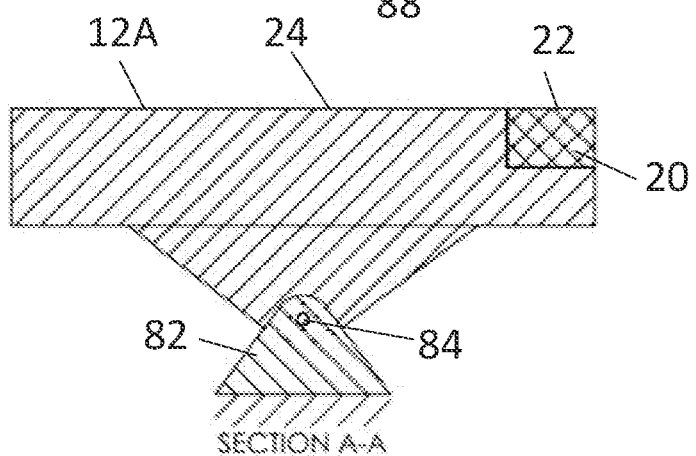

LUBRICATED SLIDING BEARING WITH ADJUSTMENT OF THE PROPERTIES OF THE LUBRICANT IN CERTAIN PARTS OF THE BEARING GAP

FIELD OF THE INVENTION

The present invention relates to a bearing device having a lubricant which is electrorheological or magnetorheological or which has a temperature dependent viscosity and which comprises one or more activators for locally increasing the viscosity of the lubricant. The present invention also relates to a bearing device having a lubricant which has a slip velocity which is controllable with an electric field and which comprises one or more (electric) activators for locally decreasing the slip velocity of the lubricant.

BACKGROUND OF THE INVENTION

Many different bearing devices with lubricants exist. These bearing devices are widely used in machinery, including vessels, power plants, other vehicles such as cars and other machinery.

Bearing devices can be classified as hydrostatic, hydrodynamic or hybrid. Each of these has specific advantages and disadvantages. It is noted that the term "bearing device" in the context of the present document is intended to be limited to bearing devices without roller elements such as ball bearings. In other words, the load between the stationary part of the bearing device and the moving part of the bearing device is transferred by the lubricant.

An advantage of a hydrostatic bearing device is that in use there will never be any contact between the stationary part and the moving part, regardless of whether the moving part moves or not. A disadvantage of a hydrostatic bearing device is that the hydrostatic bearing device requires a continuous supply of lubricant by an external pressurized source. If the source malfunctions, the pressure of the lubricant in the bearing is lost. The parts may come into contact and as a consequence the bearing may become damaged or become subject to wear.

A further disadvantage of a hydrostatic bearing device is that for improved performance it requires that the surfaces at the end(s) of the bearing gap are closer spaced together in order to capture and maintain a higher hydrostatic pressure. This is generally carried out with so-called "surface texturing" in the form of a land and a pad. This surface texturing requires very precise machining to achieve the desired surface finish. Furthermore, because of the requirement of very precise machining, the surface texturing is also vulnerable to wear and tear in case the moving part and the stationary part come in contact with one another.

An advantage of a hydrodynamic bearing device is that it requires no surface texturing. The surfaces of the stationary and moving part can be completely smooth which is easier to manufacture. A further advantage is that a hydrodynamic bearing device does not require a pressurized supply of lubricant. This reduces the risk of failure.

A disadvantage of a hydrodynamic bearing is that the working is dependent on the formation of hydrodynamic pressure. This pressure is only formed when the moveable part moves relative to the stationary part. When the moveable part does not move or moves too slowly, physical contact between the moveable part and stationary part occurs, resulting in friction and wear and tear of the parts. This occurs in particular during startup or slowdown of the machine when the relative speed of the parts is low. In other words, a hydrodynamic bearing needs to have sufficient speed in order to work.

It is noted that hydrodynamic bearing devices generally also have a source of lubricant in order to prevent the bearing device from becoming empty. However, for a hydrodynamic bearing device the pressure with which the lubricant entered into the bearing is much lower, and does not contribute significantly to the load bearing capacity of the hydrodynamic bearing. Instead the load bearing capacity is formed by the hydrodynamic pressure created by the rotation of the rotary part relative to the stationary part.

Hybrid bearings exist which combine some of the advantages of hydrostatic and hydrodynamic bearings. However, the performance of hybrid bearings is limited. Hybrid bearings generally have limited surface texturing. The small amount of surface texturing improves the performance in the dynamic working regime but limits the performance in the static working regime. Also, the hydrostatic working regime requires a pump which is sensitive to failure.

Bearing devices can also be classified according to their shape and the movement they allow. A journal bearing typically surrounds a rotary shaft and provides support in a radial direction. A journal bearing can be referred to as a radial bearing. A thrust bearing also surrounds a rotary shaft but provides support in the axial direction of the shaft. A thrust bearing can be referred to as an axial bearing. Flat bearings have a flat bearing surface and provide support in a direction orthogonal to the flat bearing surface. A thrust bearing is an example of a flat bearing. Conical bearings also exist. Conical bearings form a hybrid between a journal bearing and a thrust bearing and can transfer both an axial load and a radial load. Often conical bearings are provided in a pair wherein the first and second conical bearing taper in opposite directions.

It is a longstanding objective to improve the lubrication in order to reduce wear and tear of the various parts of bearing devices. In the past bearing devices using a lubricant having electrorheological or magnetorheological characteristics have been disclosed. An electrorheological lubricant (ERL) is a lubricant which comprises electrically polarizeable particles which are dispersed in the liquid. A magnetorheological lubricant (MRL) is a lubricant which comprises magnetic particles which are dispersed in the fluid.

These bearing devices comprise activators for increasing the viscosity of the lubricant in order to improve the lubrication of the bearing device.

One such disclosure is U.S. Pat. No. 7,980,765B2. This document discloses a hydrodynamic bearing device having activators. With the activators, the viscosity of the lubricant can be increased locally. In this way the lubricant can be manipulated to stay in certain regions, thereby improving the lubrication and the load which the bearing device can carry.

In particular, the embodiment disclosed in FIG. 14 of U.S. Pat. No. 7,980,765B2 is of interest. FIG. 14 shows a hydrodynamic journal bearing device. The activators 200, 2001 are elongate and extend parallel to the main axis of the shaft. The activators extend from one bearing end to an opposite bearing end. The activators are spaced apart in a circumferential direction around the shaft. The activators increase the viscosity of the lubricant in an obstruction zone in the bearing gap near the activators. When the rotary shaft rotates, rotary shaft will urge the lubricant to flow in the same direction as the rotation direction of the shaft. The lubricant with increased viscosity in each obstruction zone at each activator in the bearing gap prevents the lubricant from traversing each obstruction zone. As a result, the pressure of the lubricant in the bearing gap will be increased just upstream of each activator. This improves the hydrodynamic effect of the bearing.

A disadvantage of the embodiment of FIG. 14 is that for regions in the gap which are remote from the activators and which are not affected by the activators, no or relatively little increase in pressure occurs. Because the activators only have an effect in a part of the total bearing surface, the combined effect of the activators is limited.

A solution proposed in U.S. Pat. No. 7,980,765B2 is to provide a large number of activators in order to cover the entire inner surface of the stationary part, see column 20, lines 31-41. However, it was recognized in the present invention that this solution is rather complex and expensive.

The present invention is based on the insight that with a limited number of activators, the effect can be extended to the entire bearing gap or to a large portion of the bearing gap.

Another publication in this field is the article "Active hydrostatic bearing with magnetorheological fluid" by Hesselbach in the Journal of applied physics 93, 8441 (15 May 2003). This article discloses a hydrostatic bearing device having a land and a pad, see FIGS. 1 and 3. The hydrostatic bearing device comprises an inlet and an external pressure source. An activator in the form of a coil is provided to locally increase the viscosity of the lubricant. The coil extends around the bearing and is visible in FIG. 3. A disadvantage of this bearing device is that the very precise machining to make the land and the pad is still required. The associated vulnerability to wear and tear of the land and pad is also still present.

Further improvements to the same concept are disclosed in the article "Development of bearings and a damper based on magnetically controllable fluids" by Guldbakke and Hesselbach from 2006. The apparatus disclosed in this article also requires precise machining and is also vulnerable.

OBJECT OF THE INVENTION

It is an object of the invention to provide a bearing device which combines a number of advantages of hydrostatic bearing devices and hydrodynamic bearing devices, in particular the advantage of a hydrostatic bearing device that contact between the stationary and moving part is avoided both during movement and during non-movement of the different parts, and in particular the advantage of a hydrodynamic bearing device that no surface texturing is present. The absence of surface texturing has an advantage of associated reduction in vulnerability.

It is an object of the invention to provide a bearing device capable of carrying larger loads than bearing devices of the prior art which use an electrorheologic or magnetorheologic lubricant. The present invention may also be used with a lubricant having a temperature dependent viscosity or a controllable slip velocity.

It is a further object of the present invention to provide an improved hydrodynamic bearing.

It is a further object of the present invention to provide an improved hydrodynamic bearing in which leakage of lubricant from the bearing gap is reduced with respect to hydrodynamic bearing devices of the prior art.

It is a further object of the present invention to provide a bearing device which is an alternative to the prior art.

SUMMARY OF THE INVENTION

In order to achieve at least one of the objects, the invention provides a bearing device comprising:

a first surface and a second surface which are moveable relative to one another and which face one another, wherein the first surface and second surface are separated by a bearing gap filled with a lubricant, wherein the lubricant is a magnetorheological liquid or an electrorheological liquid, a lubricant having a temperature dependent viscosity, or a lubricant having a controllable slip velocity, one or more supply inlets in the first or second surface, each supply inlet configured to supply the lubricant from a pressurized liquid source to the bearing gap, one or more activators embedded in the first or second surface and configured to locally increase a viscosity of the lubricant or locally decrease the slip velocity of the lubricant in at least one obstruction zone in the bearing gap, thereby locally inhibiting a flow of the lubricant through the bearing gap in the obstruction zone, wherein the bearing gap comprises at least one non-obstruction zone in which the flow of the lubricant is not inhibited, wherein each non-obstruction zone surrounds the associated supply inlet, wherein a flow path of the lubricant through the bearing gap is defined, which flow path starts at the at least one supply inlet, extends along the at least one non-obstruction zone, traverses the obstruction zone and ends at a bearing gap end, wherein the first surface and the second surface are free of surface texturing, in particular in the form of a land and pad, and are smooth and continuous and are without any abrupt changes in a height of the bearing gap, wherein the at least one obstruction zone either by itself or in cooperation with other obstruction zones encloses the at least one non-obstruction zone, wherein the lubricant having an increased viscosity or decreased slip velocity in the obstruction zone acts as an obstruction of the flow path and either by itself or in cooperation with lubricant with increased viscosity or decreased slip velocity in other obstruction zones inhibits the lubricant from flowing out of the non-obstruction zone and flowing out of the bearing gap through the bearing gap end, thereby increasing a pressure of the lubricant in the non-obstruction zone to a level which is sufficient to carry a load on the bearing device and while preventing contact between the first and second surface.

When the activators are activated, the obstruction in the obstruction zone inhibits the lubricant from flowing through the obstruction zones and raises the pressure in the non-obstruction zone in comparison with a non-activated state of the activators.

In effect, the obstruction zones act as the pads (also called the surface texturing) of a hydrostatic bearing device and replace the pads of a hydrostatic bearing device. This has the advantage that the advantages of a hydrodynamic bearing device can be achieved without the land and pad arrangement, in other words without any surface texturing. The bearing device according to the invention therefore has smooth and continuous first and second surfaces without any abrupt changes in the surface.

To this end, a well chosen pattern of activators generates a 'virtual' surface texture: An electrostatic or magnetic or temperature field with a specific distribution that results in a specific spatial viscosity variation in the fluid. This spatial viscosity variation forces the fluid to flow in a pattern that is similar to the flow that is observed in a fluid with a constant viscosity flowing in a bearing with a physical surface texture.

Additionally this virtual texture may be turned on and off, or modified to define a different virtual texture, allowing the bearing to function with optimal efficiency in a wide range of operating conditions.

The performance of the bearing is influenced by the selection of the activators that are activated, and by the degree in which these activators are activated. This selection and degree of activation allows for an optimal operation of the bearing for different operating conditions, such as different sliding directions, or different loads.

The bearing device according to the invention may be used with a lubricant having a controllable slip velocity. This may be a lubricant comprising electric dipoles. The activation of the activators (which will generally be electric) will have the effect that the dipoles are oriented in a predetermined orientation in the obstruction zones. This has the effect that the slip velocity decreases locally, i.e. in the obstruction zone, and has as a consequential effect that the molecules of the lubricant tend to stick better to the first and second surface. This results in an increase in the slip angle of the lubricant at the bearing surface in the obstruction zone, resulting in an obstruction of the flow of the lubricant in the obstruction zone.

In theory, in fluid mechanics generally a boundary condition of no slip is assumed at the boundary surface. However, in reality that boundary condition may not always fully apply in case of high slip velocity of the lubricant. With the present invention, the boundary condition, also referred to as the slip angle, can be influenced by changing the slip velocity of the lubricant. Because in practice the bearing gap is very thin (tens of micrometers) the effect of the increased slip angle is an obstructed flow in the obstruction zone.

The dipoles may have a side having a positive electric charge and a side having a negative electric charge. One of these sides may be attracted to the boundary surface and the other side may be repulsed by the boundary surface. If the activators orient the dipoles in such a way that the side which is attracted to the boundary surface faces the boundary surface, these dipoles may become attached to the boundary surface. In this way the slip angle may be increased and the boundary condition of zero velocity may be fully realized. The boundary condition may be locally modified without modifying the viscosity of the lubricant. As such it is a different way of achieving the same result than the use according to the invention of a lubricant which is electrorheological or magnetorheological or which has a temperature dependent viscosity.

Because of the full enclosure of the non-obstruction zone by the obstruction zones, the lubricant is locked in the non-obstruction zone. The obstruction zones act as an obstruction. The skilled person will understand that this locking in practice will not be absolute and that some lubricant will continue to traverse the obstruction zone and reach the bearing gap end. However, in practice that is not a major problem.

A skilled person will also understand that in the least one non-obstruction zone in which the one or more activators have no effect, the words "no effect" should be interpreted in line with laws of physics which dictate that in theory a magnetic field of electric field does not have an end but gradually diminishes in strength. The words "no effect" mean that the effect in the obstruction zone(s) on the viscosity is negligible.

The pressure of the lubricant in the non-obstruction zone is increased to a level which is sufficient to carry a load on the bearing device and to prevent contact between the first and second surface. It will be understood that the lubricant in the obstructions zones is also under pressure and will also carry a part of the load and assists in preventing contact between the first and second surface.

In an embodiment of the bearing device, the activators are electromagnets or permanent magnets which create a magnetic field or are electric activators which can be electrically charged to create an electric field. In an alternative embodiment the activators may be cooling elements configured to cool the lubricant in the at least one obstruction zone.

In an embodiment, the bearing device comprises a plurality of non-obstruction zones, in particular three non-obstruction zones, each non-obstruction zone having a respective inlet, and a plurality of obstruction zones, wherein each obstruction zone surrounds a non-obstruction zone with which it is associated and inhibits the lubricant from flowing out of the associated non-obstruction zone.

In an embodiment of the bearing device, the non-obstruction zones are pie-shaped, circular, square, rectangular, triangular, polygonal or oval or more in general any shape which may be surrounded by an obstruction zone. In case of polygons, the non-obstruction zones may be hexagonal. Other shapes may also be used, and a combination of different shapes may also be used.

In an embodiment of the bearing device, the first surface and the second surface are cylindrical or, conical, spherical or flat and extend around a main rotation axis.

In an embodiment of the bearing device, the first and second surfaces are cylindrical, conical, spherical or flat, the bearing device comprising multiple non-obstruction zones, each non-obstruction zone being surrounded by an obstruction zone, wherein each obstruction zone comprises a first axial part and a second axial part which extend over an axial distance and a first circumferential part and a second circumferential part which extend over a circumferential distance, each obstruction zone comprising four corners which interconnect the first and second axial part and the first and second circumferential part.

In an embodiment, the bearing device comprises at least a first obstruction zone which is ring shaped and a second obstruction zone which is ring shaped, wherein the first obstruction zone is located at a first end of the cylindrical, conical, spherical or flat bearing and wherein the second obstruction zone is located at a second opposite end of the cylindrical, conical, spherical or flat bearing, wherein the non-obstruction zone is provided between the first and second obstruction zone, and wherein the first and second obstruction zones act as seals which inhibit the lubricant from flowing out of the non-obstruction zone and out of the cylindrical, conical, spherical or flat bearing gap through the bearing gap end.

In an embodiment of the bearing device the first and second surfaces are a combination of cylindrical, conical, spherical or flat surface sections.

In an embodiment, the bearing device comprises at least one outer obstruction zone which surrounds an inner obstruction zone. This results in a more stable overall configuration.

In an embodiment, the bearing device is a thrust bearing configured to carry a load in an axial direction, wherein the first and second surface are annular and extend around a main rotation axis of the bearing device, the main rotation axis extending orthogonal to the first surface and second surface, the bearing device comprising an outer circumferential bearing end and an inner circumferential bearing end, the bearing device comprising at least one outer obstruction zone which inhibits the flow of lubricant from the at least one non-obstruction zone to the outer circumferential bearing end, and at least one inner obstruction zone which inhibits the flow of lubricant from the at least one non-obstruction zone to the inner circumferential bearing end, wherein the at least one non-obstruction zone (24) is located between the inner and outer obstruction zone.

In an embodiment of the bearing device, the first surface and second surface are flat or spherical, the bearing device only comprising an outer bearing gap end and a non-obstruction zone which is encircled by an annular obstruction zone which inhibits the lubricant from flowing out of the bearing gap through the outer bearing gap end.

In an embodiment of the bearing device, the one or more activators are called primary activators, the bearing device further comprising one or more anti-activators which are electromagnets or permanent magnets or electric activators or heating elements, wherein the anti-activators create an opposed magnetic or electric field for cancelling out the magnetic or electric field created by the primary activators in at least a part of the non-obstruction zone or are heating elements for heating the lubricant in the non-obstruction zone or in at least a part of the non-obstruction zone. In an alternative embodiment, the anti-activators may comprise heating elements.

In an embodiment of the bearing device, the anti-actuators have effect in a part of the non-obstruction zone, wherein said part is called an anti-obstruction zone, wherein the non-obstruction zone further comprises a non-influence zone which is not under the influence of the primary activators or anti-activators, wherein at least one anti-obstruction zone is located adjacent an obstruction zone and between said obstruction zone and a non-influence zone.

In an embodiment of the bearing device, the activators are electromagnets, the bearing device further comprising at least one passive ferromagnetic member configured for increasing the electromagnetic field.

In an embodiment of the bearing device, the electromagnetic activator is a coil having a main axis, the coil being located underneath the first or second surface, an end of said coil being located at a distance from the surface underneath which the coil is located, wherein the at least one ferromagnetic member comprises an inner member located within the coil and an outer member located outside the coil, wherein the inner and outer member comprise respectively an inner projection and an outer projection which extend beyond the end of the coil towards said first or second surface, wherein an opening is provided between said inner and outer projection.

In an embodiment of the bearing device, the bearing device is free of any roller elements such as balls or cylindrical roller elements.

In an embodiment of the bearing device, the one or more activators are positioned underneath a layer of material which covers the at least one activator and which forms the first or second surface.

In an embodiment of the bearing device, an obstruction zone is defined by multiple activators which are arranged adjacent one another along a line. The line may be curved in one or two planes of curvature and/or may have corners.

In an embodiment of the bearing device, the bearing gap has a uniform height between the inlet and the bearing gap end.

Hydrodynamic Bearing Device

In a further embodiment, the present invention relates to a hydrodynamic bearing device comprising:
 a first bearing surface, and
 a second bearing surface which faces the first bearing surface, wherein the first and second bearing surface are configured to rotate relative to one another about a main rotation axis,
 a bearing gap defined between the first and second bearing surface, wherein the first and second bearing surface are smooth and free of any surface texturing, the bearing gap being free of any abrupt changes in the height of the bearing gap, the bearing gap being filled with a lubricant, wherein the lubricant is a magnetorheological liquid or an electrorheological liquid, a lubricant having a temperature dependent viscosity, or a lubricant having a controllable slip velocity,
 a plurality of activators embedded in the first or second bearing surface and configured to locally increase a viscosity of the lubricant or decrease the slip velocity of the lubricant in a plurality of obstruction zones, thereby inhibiting a flow of the lubricant through the bearing gap in each obstruction zone,
 a plurality of non-obstruction zones in which the flow of the lubricant is not inhibited, wherein in a direction of relative movement between the first and second bearing surface the obstruction zones and non-obstruction zone are provided in turns, each non-obstruction zone being located upstream of an associated obstruction zone,
 wherein each obstruction zone has a curved or angular shape, wherein the curved or angular shape defines a top being directed downstream, wherein the obstruction zone is configured to cause, when the first and second surfaces move relative to one another, a local rise of a pressure of the lubricant within the bearing gap in the non-obstruction zone which is located upstream of each obstruction zone and in particular in a peak zone which is located directly upstream of each top by locally increasing the viscosity or decreasing the slip velocity in the obstruction zone and inhibiting the flow of the lubricant across each obstruction zone.

The obstruction zones act as the surface texturing in hydrodynamic bearings. Generally, such surface texturing hydrodynamic bearings of the prior art is provided in the form of grooves. In the prior art, such grooves may have an intricate form designed to optimize the increase in hydrodynamic pressure. The grooves require precise machining and are also vulnerable to wear and tear. The absence of these grooves makes the bearing easier to manufacture and less vulnerable which is advantageous. A result may be a longer life span of the bearing device.

In an embodiment of the hydrodynamic bearing device, each obstruction zone comprises a left section and a right section which extend at an angle to a radial direction, wherein the left and right section direct the lubricant towards the peak zone.

In an embodiment of the hydrodynamic bearing device, wherein each top is located in a central region of the first or second surface, wherein the tops are in particular located at a distance from an inner bearing end of the first or second surface, wherein the distance is 40-60 percent of a width of the first or second surface. A distance to an outer bearing end may also be 40-60 percent of the width of the first or second surface.

In an embodiment, the hydrodynamic bearing device is a thrust bearing device, wherein the first and second surface are flat and extend orthogonal to said main rotation axis, wherein the obstruction zones extend over a radial distance.

In an embodiment of the hydrodynamic bearing device, the first and second surface are annular and the bearing gap is annular.

In an embodiment of the hydrodynamic bearing device, wherein the obstruction zones have a V-shape or a U-shape.

In an embodiment of the hydrodynamic bearing device, the bearing is a journal bearing or a conical bearing, wherein the curved or angled obstruction zones are spaced about the circumference of the first or second surface and extend over an axial distance.

It is noted that a special kind of hydrodynamic bearing exists which is generally called a tilting pad bearing. In this embodiment, the bearing device is a tilting pad bearing device and comprises a plurality of tilting pads which are tiltable about a pivot axis, wherein the first surface comprises a plurality of first surface sections, each first surface section being associated with a tilting pad, and wherein the bearing gap comprises a plurality of bearing gap sections, each bearing gap section associated with a tilting pad, wherein each first surface section is smooth and free of any surface texturing, and each individual bearing gap section between a tilted pad and the opposed second surface is free of any abrupt changes in the height of the bearing gap, wherein each first surface section comprises an obstruction zone having a curved or angular shape, wherein the curved or angular shape defines a top being directed downstream, wherein the obstruction zone is configured to cause, when the first and second surfaces move relative to one another, a local rise of a pressure of the lubricant within the bearing gap in the non-obstruction zone which is located upstream of each obstruction zone and in particular in a peak zone which is located directly upstream of each top by locally increasing the viscosity or locally decreasing the slip velocity in the obstruction zone and inhibiting the flow of the lubricant across each obstruction zone.

It is noted that between the tilting pads, there may be non-supporting zones which are not considered part of the bearing gap and not considered part of the first surface, because these zones do not contribute substantially in the transfer of the forces between the first and second surface.

The shape of the obstruction zone of each tilting pad will generally be U-shaped but may also have an angular form such as a V-shape or may have a curved form. There may also be multiple obstruction zones side by side on a single tilting pad.

The present invention further relates to a hydrodynamic journal bearing device comprising:
 a cylindrical bearing member extending around a shaft, wherein the cylindrical bearing member comprises a first surface which faces inwardly,
 the shaft comprising a second surface which faces outwardly, and
 wherein the hydrodynamic journal bearing device has a bearing length and has a first end and an opposite second end,
 a bearing gap which exists between the first surface and the second surface, wherein the bearing gap has a first bearing gap end at the first bearing end and a second bearing gap end at the second bearing end, wherein the first bearing surface and the second surface are smooth and continuous, the bearing gap being filled with a lubricant, wherein the lubricant is a magnetorheological liquid or a electrorheological liquid, a lubricant having a temperature dependent viscosity, or a lubricant having a controllable slip velocity,
 at least a first activator and a second activator embedded in the first or second surface and configured to locally increase a viscosity of the lubricant or locally decrease the slip velocity of the lubricant in a first obstruction zone and a second obstruction zone in the bearing gap, wherein when activated the first and second activator increase the viscosity of the lubricant or decrease the slip velocity of the lubricant in the first and second obstruction zone and inhibit the lubricant from flowing across the first and second obstruction zone,
  wherein the first surface and the second surface are free of surface texturing, and are smooth and continuous and are without any abrupt changes in the height of the bearing gap,
  wherein the bearing gap comprises at least one non-obstruction zone in which the flow of lubricant is not inhibited,
  wherein the first and second bearing gap end are annular and extend around the shaft and extend in a plane which is orthogonal to the longitudinal bearing axis,
  wherein the first and second obstruction zones are ring-shaped and are located at opposite ends of the journal bearing, wherein the non-obstruction zone is located between the first and second obstruction zone,
  wherein the first obstruction zone inhibits the lubricant from reaching the first bearing gap end and wherein the second obstruction zone inhibits the lubricant from reaching the second bearing gap end,
  wherein the first obstruction zone and the second obstruction zone together inhibit the lubricant from flowing out of the non-obstruction zone and flowing out of the bearing gap through the bearing gap ends.

This embodiment of the invention provides a very simple overall construction for a hydrodynamic journal bearing device. The lubricant is effectively prevented from flowing out of the bearing gap end.

In an embodiment of the hydrodynamic journal bearing device, a height of the bearing gap is constant in an axial direction.

In an embodiment of the hydrodynamic journal bearing device, a height of the bearing gap varies in a circumferential direction. This is customary for hydrodynamic journal bearings, because the shaft is generally slightly off-centre to create the required radial force.

In an embodiment of the hydrodynamic journal bearing device, the bearing device has a length, wherein each obstruction zone has a width, wherein the width of each obstruction zone is less than 10 percent of the length. Advantageously, a large part of the bearing device contributes in carrying the load.

The present invention further relates to a drive assembly comprising a shaft, wherein the shaft is supported by at least one bearing device according to the invention.

In an embodiment of the drive assembly, the shaft is supported by a first bearing device according to the invention insofar as relating to a journal bearing device, a second bearing device according to the invention insofar as relating to a journal bearing device, the first and second journal bearing device positioning the shaft and providing support for the shaft in two independent radial directions (Y,Z), and a third bearing device according to the invention insofar as relating to a thrust bearing device, the third thrust bearing device positioning the shaft and providing support for the shaft in an axial direction (X). This arrangement provides support for the shaft in all required directions.

The present invention further relates to a vessel comprising a hull, an engine, a propeller, and a drive assembly according to the invention which connects the engine with the propeller. It was found that the present invention is in particular well suited for vessels, because it provides a robust and reliable overall arrangement. However, the invention may be used in all kinds of equipment including other vehicles, power plants, wind turbines, engines in general and other types of equipment.

These and other aspects of the invention will be more readily appreciated as the same becomes better understood by reference to the following detailed description and considered in connection with the accompanying drawings in which like reference symbols designate like parts.

SHORT DESCRIPTION OF THE FIGURES

FIG. 10B shows an isometric view of another embodiment of the invention.

FIG. 21 shows an isometric view of an embodiment of the invention with tilting pads.

FIG. 22 shows a top view of the embodiment of FIG. 21.

FIG. 23 shows a sectional side view of the embodiment of FIG. 23.

DETAILED DESCRIPTION OF THE FIGURES

Figure 1A:
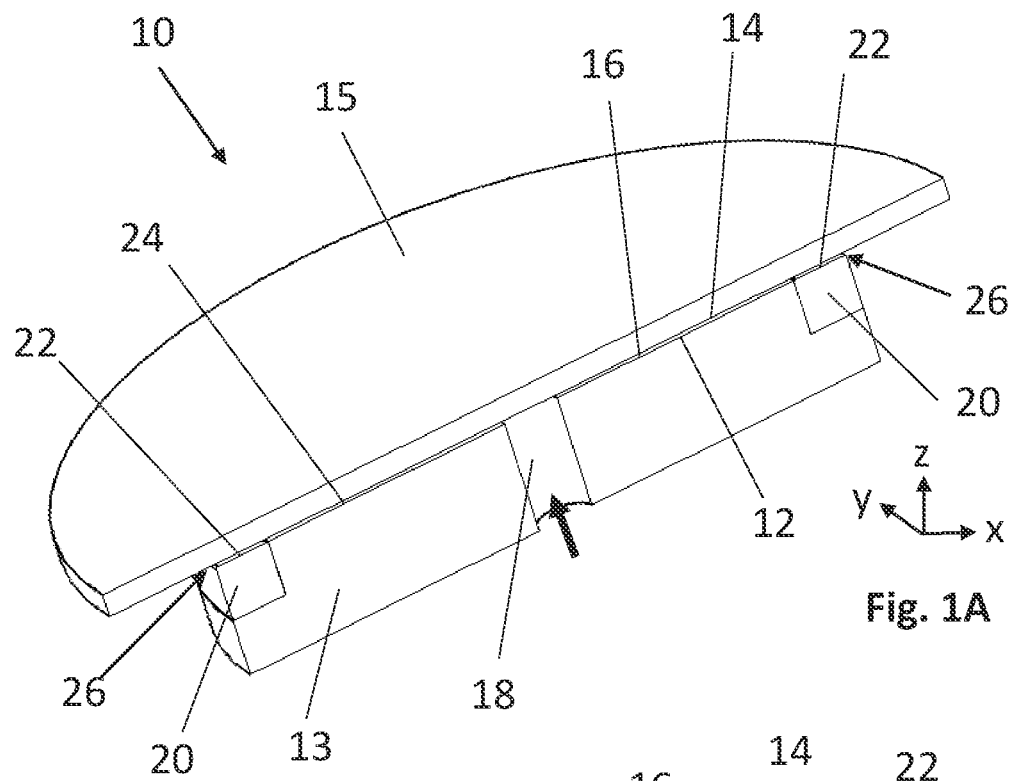
FIG. 1A shows an isometric view of a first embodiment of the present invention.

Turning to FIG. 1, a first embodiment of the invention is shown. A bearing device 10 is provided. The bearing device comprises a first surface 12 and a second surface 14 which are moveable relative to one another. In this embodiment, both the first and second surface are flat. The first and second surface face one another. The first surface and second surface are separated by a bearing gap 16 which is filled with a lubricant. The bearing gap may have a height in the order of tens of micrometres, but obviously other heights are also possible, depending on the size of the bearing device. The first surface 12 is formed by a first member 13 and the second surface 14 is formed by a second member 15.

The lubricant is a liquid. The lubricant is a magnetorheological liquid or an electrorheological liquid or a lubricant having a temperature dependent viscosity or a lubricant having a controllable slip velocity.

The bearing device comprises one or more supply inlets 18 in the first or second surface. In this embodiment, the inlet is provide in the first surface 12, but it may be envisaged that the inlet is provided in the second surface. Each supply inlet is configured to supply lubricant from a pressurized liquid source to the bearing gap. The pressurized source will be present in case of a hydrostatic bearing device but is not considered a part of the present invention.

The bearing device comprises one or more activators 20 embedded in the first surface 12 and configured to locally increase a viscosity of the lubricant in at least one obstruction zone 22 in the bearing gap, thereby inhibiting a flow of the lubricant through the bearing gap in the obstruction zone. The bearing gap comprises a non-obstruction zone 24 in which the flow of the lubricant is not inhibited. The non-obstruction zone comprises non-affected lubricant having a lower viscosity. The non-obstruction zone 24 surrounds the supply inlet 18. In this embodiment the non-obstruction zone 24 has a circular shape.

An obstruction zone may be defined by multiple activators which are arranged adjacent to one another along a line. Each activator 20 and likewise each obstruction zone 24 comprises two radial parts 29A, 29B which extend radially and a circumferential section 33 which extend circumferentially. An outflow zone 35 is defined between each pair of radial parts 29 of adjoining obstruction zones.

A flow path of the lubricant through the bearing gap is defined. The flow path starts at the at least one supply inlet 18, extends along the at least one non-obstruction zone 24, traverses the obstruction zone 22 and ends at a bearing gap end 26.

Contrary to traditional hydrostatic bearing devices, the first surface 12 and the second surface 14 are free of surface texturing in the form of a land and pad and are smooth and continuous and are without any abrupt changes in the height of the bearing gap. An upper side of the activators 20 is flush with the rest of the first surface 12. This makes the bearing device relatively easy to manufacture and relatively robust.

The obstruction zone 22 encloses the at least one non-obstruction zone 26 and inhibits the lubricant from leaving the non-obstruction zone by flowing across the obstruction zone 22 to the bearing gap end 26 and out of the bearing gap via the bearing gap end 26.

Figure 1B:
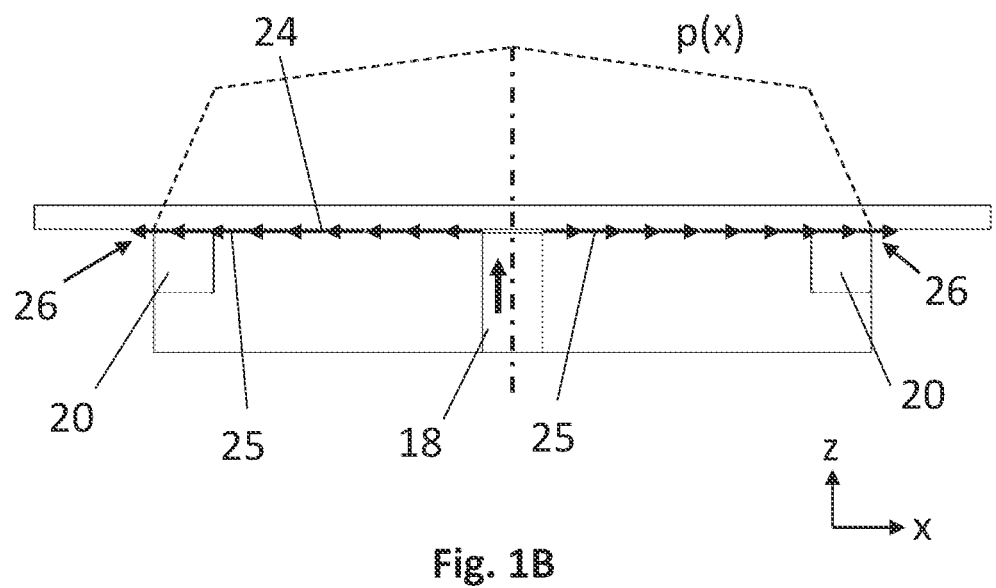
FIG. 1B shows the pressure gradient in the embodiment of FIG. 1A.

Turning to FIG. 1B, the enclosure allows the external pressure source to raise the pressure to a level in which the bearing device can carry the load and prevent contact between the first and second bearing surface, and do so without the classic surface texturing. In other words, the obstruction zone acts as surface texturing, and acts in particular as a pad. In FIG. 1B the flow path 25 is indicated with arrows in the bearing gap. The pressure as a function p(x) of the travel distance x along the flow path is indicated with dashed lines. In the non-obstruction zone 24 the pressure gradient p'(x) is relatively small. In the obstruction zone the pressure gradient p'(x) is sharp and the pressure drops to zero at the bearing gap end 26.

The bearing gap end 26 is circumferential and extends around the bearing gap 16. In this embodiment, the bearing device only comprises an outer bearing gap end 26 and a non-obstruction zone 24 which is encircled by an annular obstruction zone 22 which inhibits the lubricant from flowing out of the bearing gap through the outer bearing gap end. As will be discussed with reference to other embodiment, the bearing device may also have more than one bearing gap end.

The lubricant having an increased viscosity in the obstruction zone 22 acts as an obstruction of the flow path and either by itself or in cooperation with lubricant with increased viscosity in other obstruction zones inhibits the lubricant from leaving the at least one non-obstruction zone 26, thereby increasing a pressure of the lubricant in the non-obstruction zone to a level which is sufficient to carry a load on the bearing device and to prevent contact between the first and second surface.

The activators may comprise electromagnets or permanent magnets which create a magnetic field. In another embodiment, the activators may comprise electric activators which can be electrically charged to create an electric field. In another embodiment, the activators are cooling elements configured to cool the lubricant in the at least one obstruction zone 22. In another embodiment used with a lubricant having a controllable slip velocity, the activators are electric activators which create an electric field, thereby orienting dipoles in the lubricant and controlling the slip velocity of the lubricant.

Figure 2:
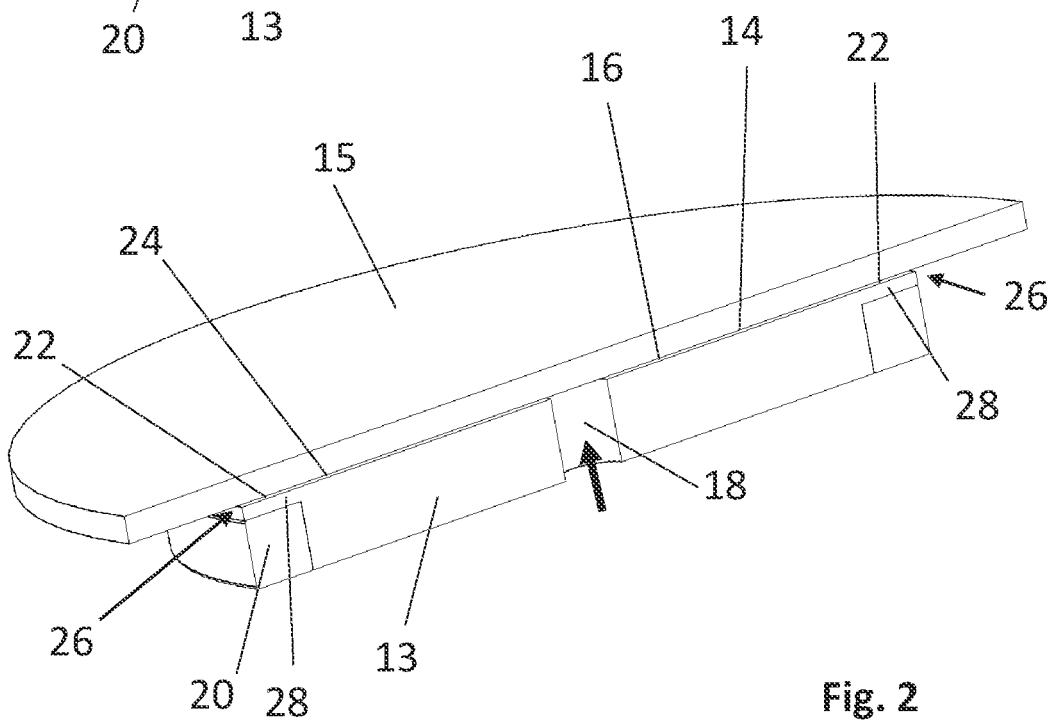
FIG. 2 shows an isometric view of a second embodiment of the present invention.

Turning to FIG. 2, a similar embodiment is shown, wherein the activators are positioned underneath a layer 28 of material which covers the at least one activator and which forms the first or second surface. This makes it easier to make the first and second surface completely smooth.

In the shown embodiments of FIGS. 1 and 2, the first and second surface are flat, but in another embodiment they may be spherical or have the shape of a part of a sphere, such as a semi-sphere. The bearing gap then also becomes spherical or semi-spherical. The bearing device may also be a swing arm bearing having a first and second surface which have the form of a "slice" of a sphere.

The bearing device of FIGS. 1 and 2 allows a movement of the first surface relative to the second surface in two independent directions of movement X, Y, while providing support in a third direction of movement. The embodiment of FIGS. 1 and 2 also allows a rotation about the Z-axis of the first surface relative to the second surface. The embodiment of FIGS. 1 and 2 prevents rotations about the Axes X and Y.

The bearing device may be free of any roller elements such as balls or cylindrical roller elements.

Figure 3:
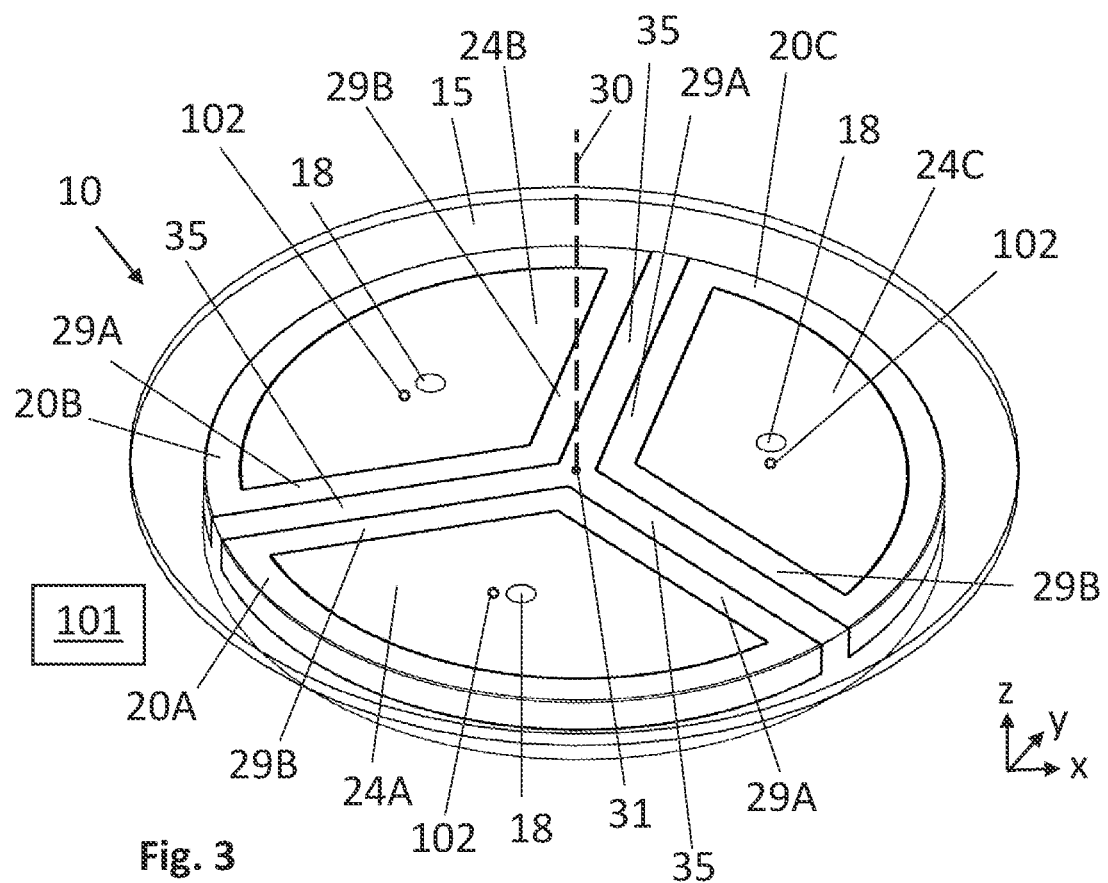
FIG. 3 shows an isometric view of a third embodiment according to the present invention.
Figure 4:
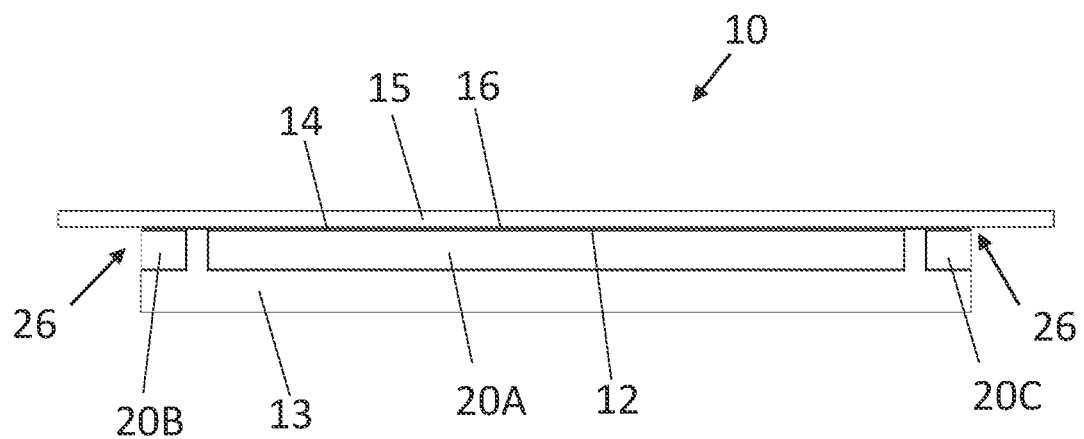
FIG. 4 shows a side view of the embodiment of FIG. 3.

Turning to FIGS. 3 and 4 another embodiment is shown. The first and second surfaces 12,14 are flat. The first and second surfaces are circular. The bearing device comprises a plurality of non-obstruction zones 24A, 24B, 24C (commonly denoted as 24), in particular three non-obstruction zones. Each non-obstruction zone has a respective inlet 18. The bearing device comprises a plurality of obstruction zones 22A, 22B, 22C (commonly denoted as 22). Each obstruction zone surrounds a non-obstruction zone with which it is associated and inhibits the lubricant from flowing out of the associated non-obstruction zone.

The non-obstruction zones in the embodiment of FIGS. 3 and 4 are pie-shaped (i.e. the shape of a circle segment). However it is possible that the non-obstruction zones may have a different shape, e.g. circular, square, rectangular, triangular, polygonal (e.g. hexagonal) or oval or a combination of these shapes.

The obstruction zones are spaced at regular angular intervals about a centre 31 and/or about a central axis 30, in particular at an angular interval of about 120 degrees.

The embodiment of FIGS. 3 and 4 provides the same capabilities of movement and support as the embodiment of FIGS. 1 and 2, with a difference in that the embodiment of FIGS. 3 and 4 is better capable of providing support against tilting of the second surface relative to the first surface about the X-axis and Y-axis. It is therefore better suited to maintain the orientation of the second surface relative to the X-axis and Y-axis. The background of this is that the bearing gap is compartmentalized in three independent pressure zones, each pressure zone being a non-obstruction zone 24A, 24B, 24C.

The source of pressure may be configured to provide independent pressures to the different non-obstruction zones. A control unit 101 may be provided to control the different pressures. Sensors 102 may also be provided. The sensors may include pressure sensors for the different non-obstruction zones. The sensors 102 may be located in or at the inlet openings 18. In case of pressure differences, the control unit 101 may increase the flow to one of the inlet openings 18 in order to restore the pressure equilibrium. Also, position sensors or orientation sensors may be provided. In case of tilting of the second surface, the tilting may be sensed by the sensors and an increase in pressure in or more of the non-obstruction zones may be provided by the control unit 101, resulting in a reversal of the tilting and in a re-alignment of the first and second surfaces.

The bearing device may allow movement in two independent directions X, Y and provide support in a third direction Z. The bearing device may allow rotation about the Z-axis and prevent rotation about the X and Y axis.

The skilled person will understand that this embodiment may be enlarged and comprise a multitude of non-obstruction zones surrounded by obstruction zones. Although the bearing device of FIGS. 3 and 4 has a circular shape, it is also possible to have a different overall shape, such as a square or rectangular shape or a linear shape. The bearing device may have a considerable size and have more than three non-obstruction zones.

Figure 14:
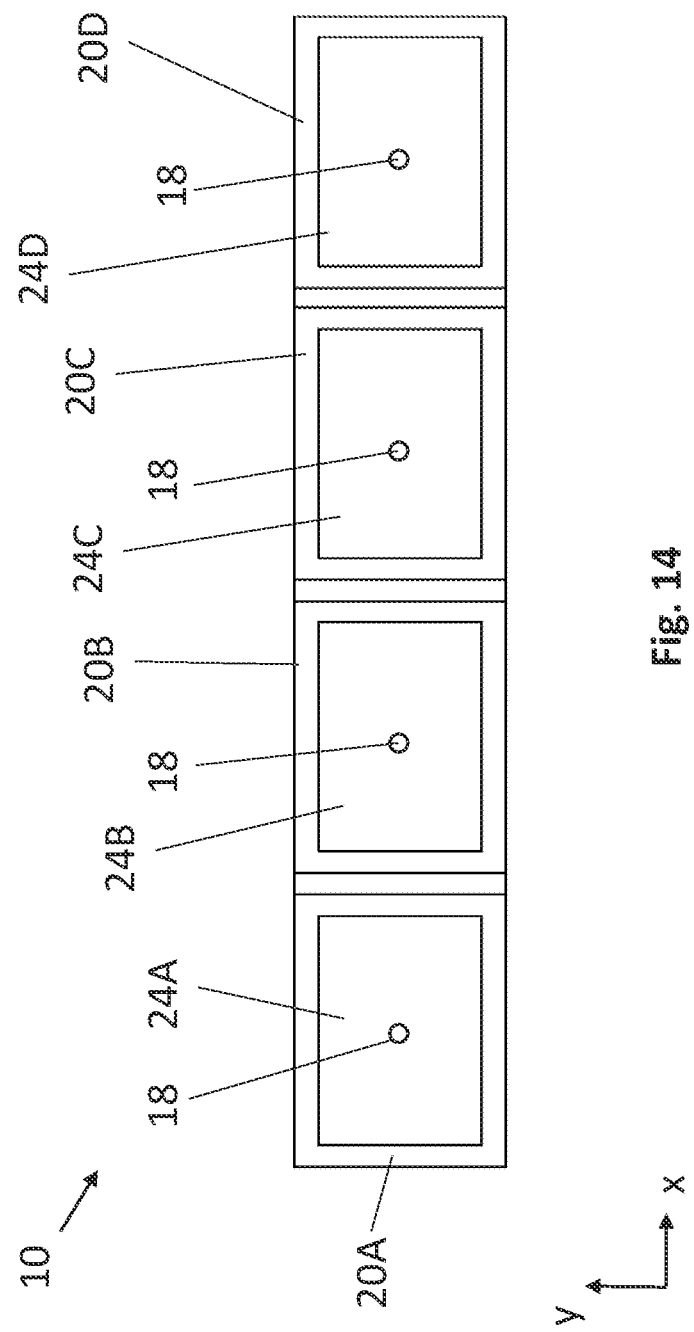
FIG. 14 shows a top view of a linear bearing device according to the invention.

Turning to FIG. 14, a variant is shown in which the bearing device is a linear bearing device. The non-obstruction zones 24A, 24B, 24C, 24D etc., are arranged in a linear arrangement, for instance along a X-axis and allow a movement of the second surface relative to the first surface along the X-axis only, while supporting the second surface in the Z-direction and providing support via separate means such as a guiding surface in the Y-direction. The different non-obstruction zones 24 also provide support against tilting of the second surface relative to the first surface about the Y-axis and may also provide support against tilting about the X-axis. The separate guide may provide support against rotation about the Z-axis.

The non-obstruction zones 24 have a square or rectangular shape, but different shapes are possible.

Figure 15:
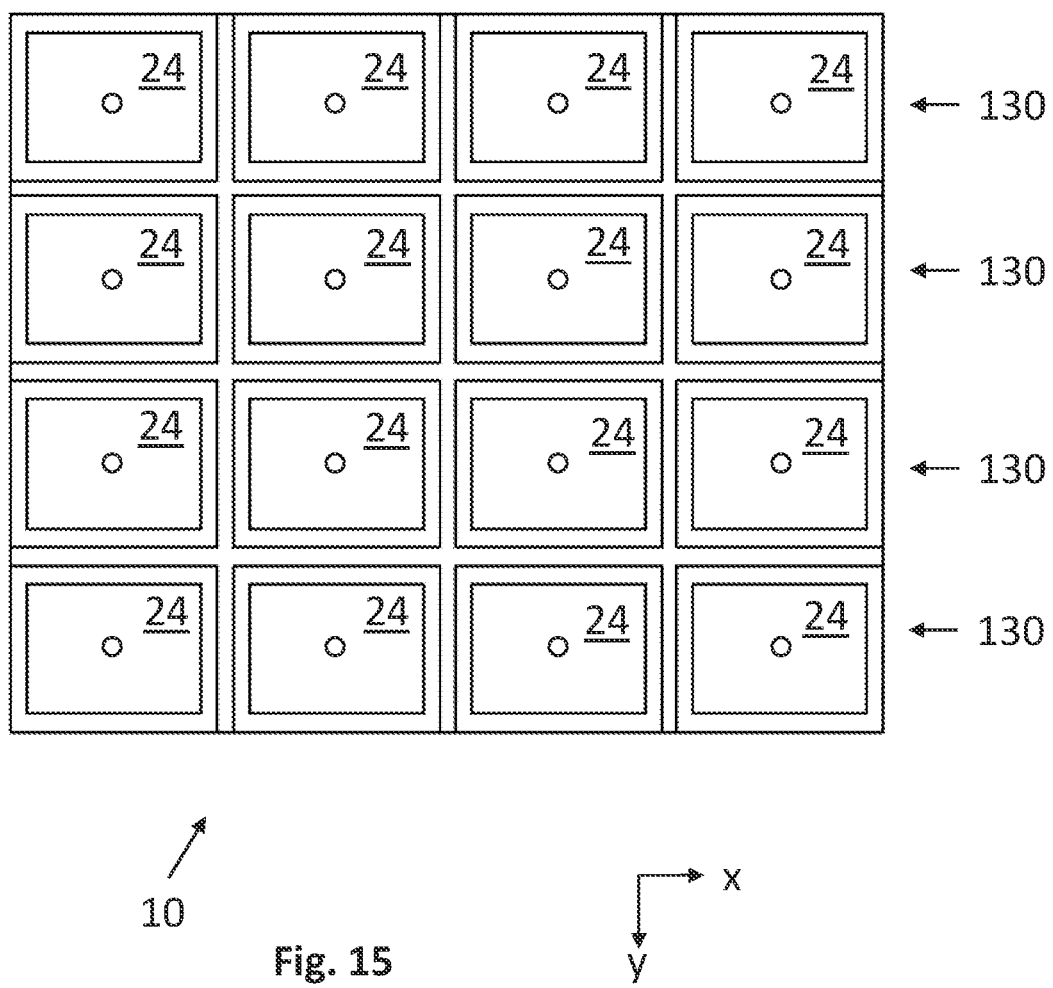
FIG. 15 shows a top view of a planar bearing device according to the invention.

Turning to FIG. 15, the variant of FIG. 16A may be expanded to cover a planar surface, the bearing device having multiple rows 130 of a plurality of non-obstruction zones 24. In such an embodiment, the bearing device allows relative movement in both the X and Y direction and about the Z-axis, while preventing tilting about the X-axis and Y-axis. The overall shape is shown as square or rectangular, but may be circular or have a different shape.

Figure 5:
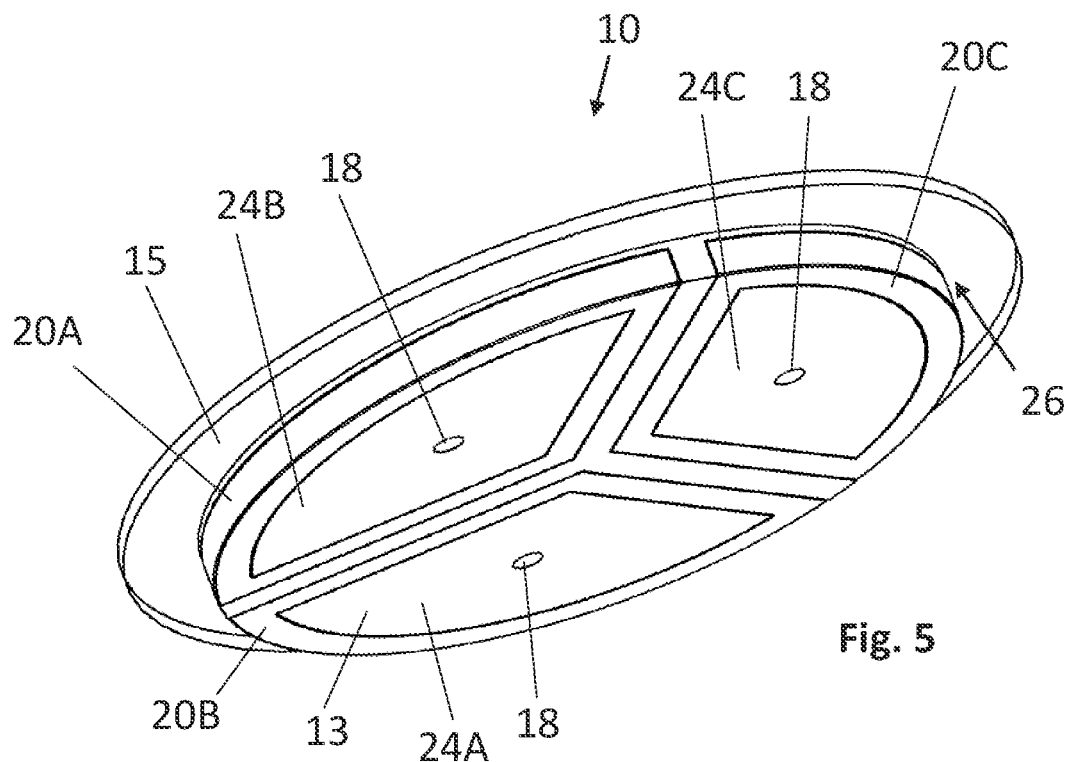
FIG. 5 shows an isometric view from below of a variant of the embodiment of FIGS. 3 and 4.
Figure 6:
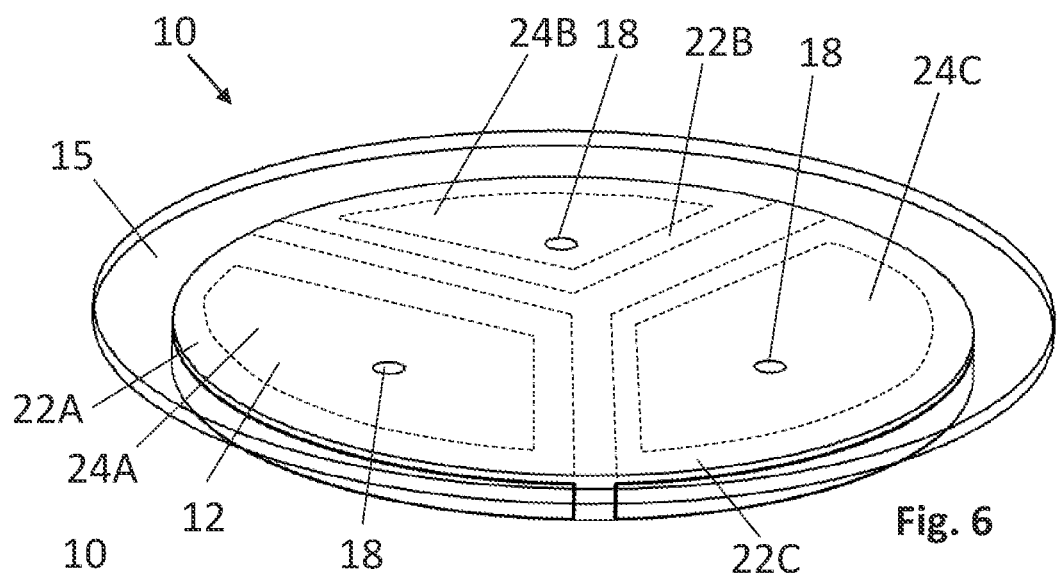
FIG. 6 shows an isometric view from above of the embodiment of FIG. 5.
Figure 7:
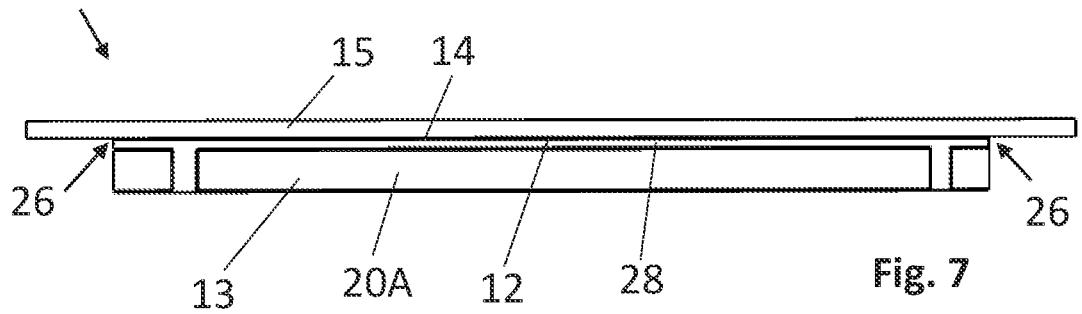
FIG. 7 shows a side view of the embodiment of FIGS. 5 and 6.

Turning to FIGS. 5, 6 and 7 a variant of the embodiment of FIGS. 4 and 5 is shown. In the variant the activators 20 are located underneath a layer of material which forms the first surface, similar to the variant of FIG. 2. This results in a completely even (or smooth) first surface, making the manufacturing process easier. An additional benefit is that the bearing is less vulnerable and more resistant to wear and tear. In FIG. 6 the obstruction zones 22A, 22B, 22C and non-obstruction zones 24A, 24B, 24C are indicated with dashed lines, because they are not visible, since the activators 20A, 20B and 20C are located underneath the first surface 12.

Journal Bearing

Figure 8:
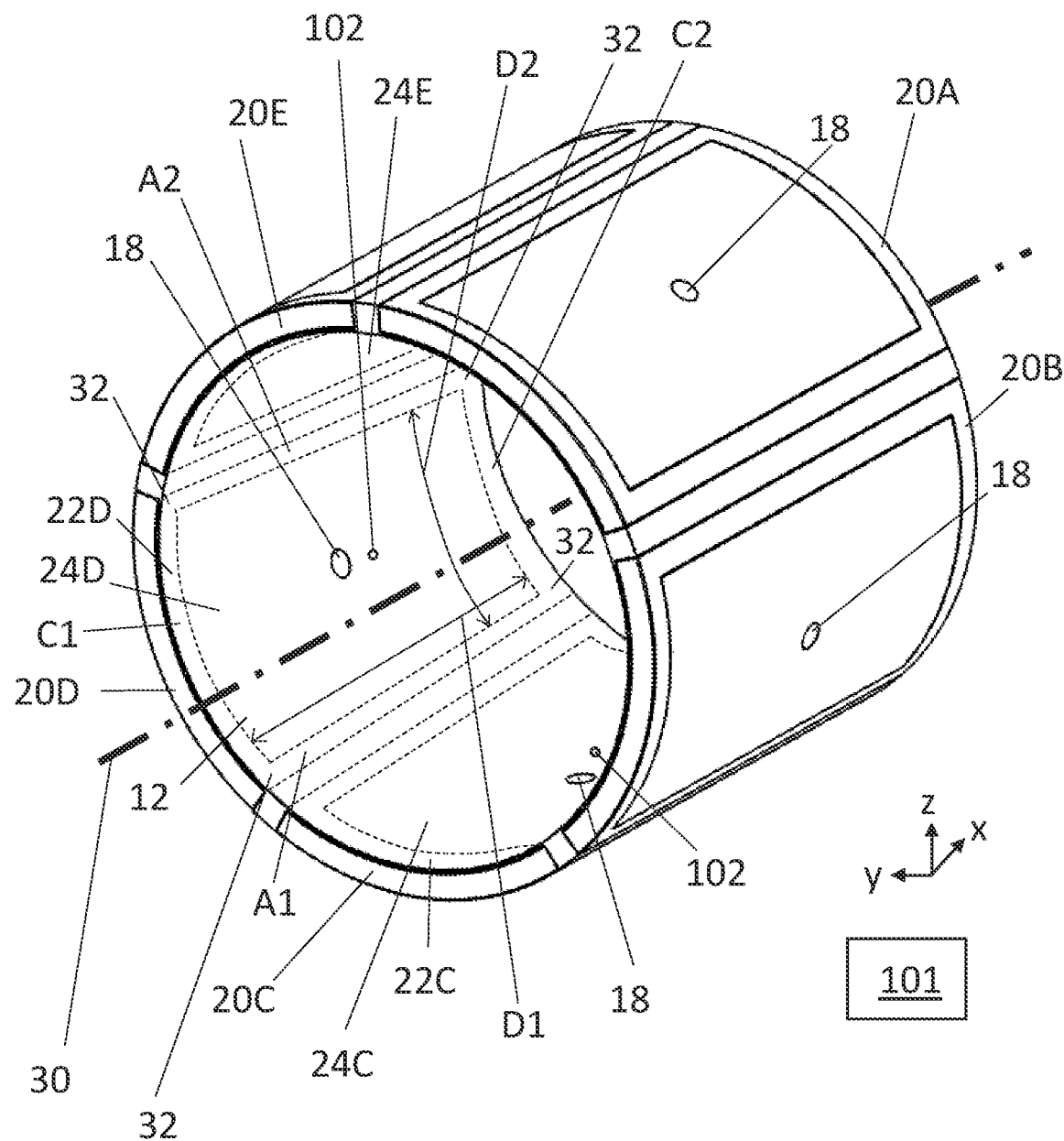
FIG. 8 shows an isometric view of another embodiment of the present invention.

Turning to FIG. 8, another variant of the present invention is shown in which the bearing device is a journal bearing, also called a radial bearing. FIG. 8 shows an outer part of a journal bearing device. The inner part may be a shaft which is not shown for clarity purposes. The outer part has an inner surface 12 which is defined as the first surface. The shaft has an outer surface which forms the second surface. The bearing gap is defined between the inner surface 12 and outer surface. The bearing device has a main rotation axis 30. The first surface 12 and the second surface are cylindrical and extend around the main rotation axis 30.

In another embodiment, the bearing device may be conical and in such a variant, the first and second surfaces are also conical.

The bearing device comprises multiple non-obstruction zones 24A, 24B, 24C, 24D, 24E, in particular five. Five has an advantage in that tilting of the axis about the radial axes Y,Z can be supported by independent control of the pressure in the different non-obstruction zones. However, a different number than five is also possible. Each non-obstruction zone is surrounded by an obstruction zone 22A, 22B, 22C, 22D, 22E.

Each obstruction zone comprises a first axial part A1 and a second axial part A2 which extend over an axial distance D1 and a first circumferential part C1 and a second circumferential part C2 which extend over a circumferential distance D2. Each obstruction zone comprises four corners 32 which interconnect the first and second axial part and the first and second circumferential part. This is indicated for the obstruction zone 22D only, but it will be clear that this is the same for the other obstruction zones.

If the bearing device is conical, a similar configuration may be applied with a difference that the obstruction zones and non-obstruction zones will taper.

In an embodiment, a control unit 101 may be provided and sensors 102 may be provided to sense a tilting of the axis about the radial axes Y,Z. The control unit may be coupled to the source of pressurized fluid or to control valves in conduits extending from the source of pressurized fluid to the inlets for individually controlling the pressure inside the non-obstruction zones. Additionally or alternatively, sensors may be provided which measure the position and/or orientation of the shaft relative to the inner surface and the control unit may be configured to control the pressures in the individual non-obstruction zones to control the position and/or orientation of the shaft relative to the inner surface.

Thrust Bearing

Figure 9A:
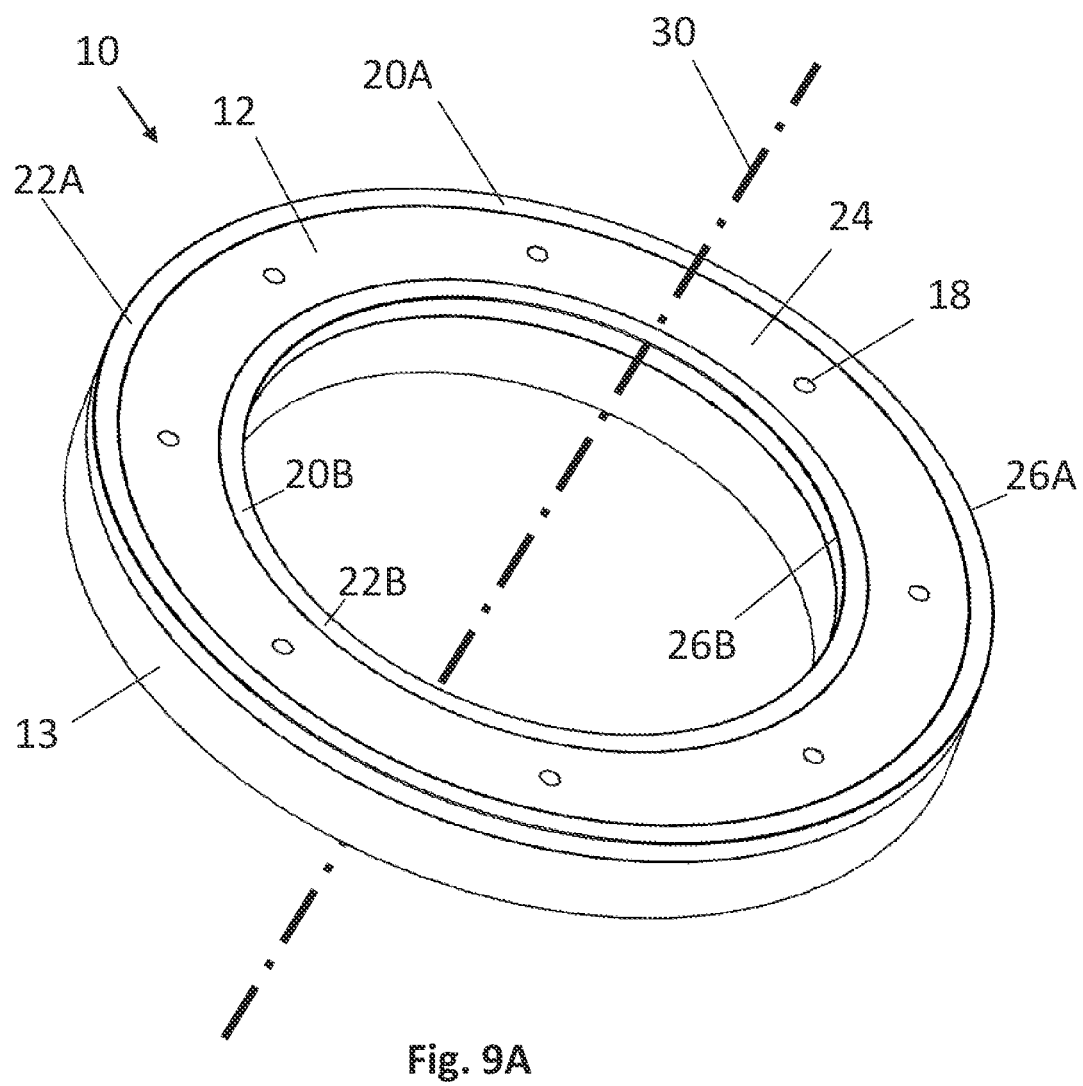
FIG. 9A shows an isometric view of another embodiment of the invention.

Turning to FIG. 9A, a thrust bearing device according to the invention is shown. The thrust bearing is configured to carry a load in an axial direction and may be called an axial bearing. Only one the first surface 12 is shown.

The first surface 12 and second surface are annular and extend around a main rotation axis 30 of the bearing. The main rotation axis 30 extends orthogonal to the first surface 12 and second surface.

The bearing device 10 comprising an outer circumferential bearing end 26A and an inner circumferential bearing end 26B. The bearing device comprises at least one outer activator 20A which extends circumferentially and defines an outer obstruction zone 22A which inhibits the flow of lubricant from the at least one non-obstruction zone 24 to the outer circumferential bearing end 26A.

The bearing device comprises at least one inner activator 20B which extend circumferentially and defines an inner obstruction zone 22B which inhibits the flow of lubricant from the at least one non-obstruction zone 24 to the inner circumferential bearing end 26B.

The at least one non-obstruction zone 24 is annular and is located between the inner and outer obstruction zone.

The bearing device comprises multiple supply inlets 18 in the first surface 12. This embodiment is a hydrostatic bearing device in that the pressure required to carry the load and prevent contact between the first and second surface is created by hydrostatic pressure.

The circumferential obstruction zones 22A, 22B inhibit the lubricant from leaving the annular non-obstruction zone via the bearing gap ends 26A, 26B.

Thrust Bearing Having a Plurality of Non-Obstruction Zones

Figure 9B:
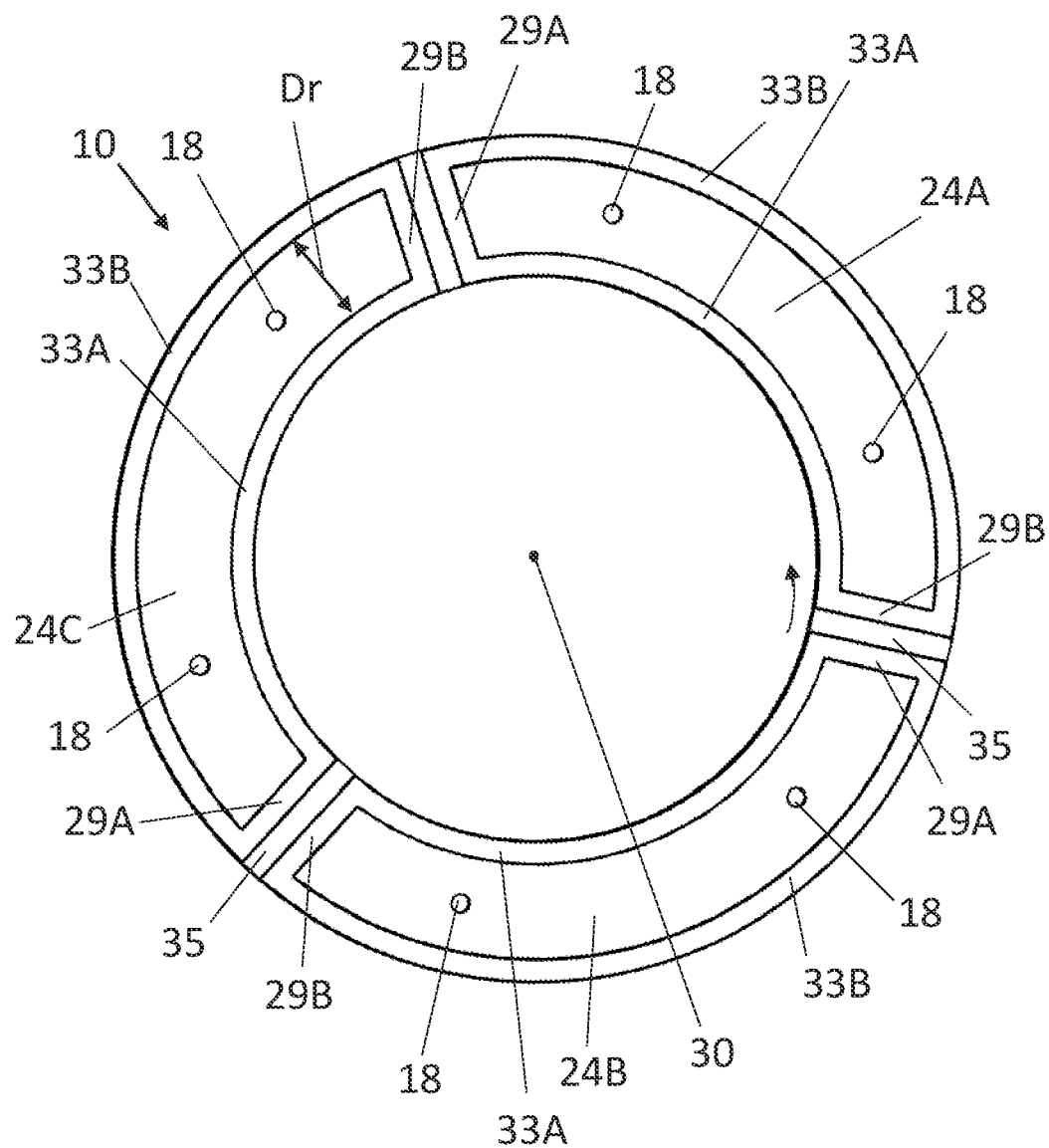
FIG. 9B shows an isometric view of another embodiment of the invention.

Turning to FIG. 9B, in another embodiment the thrust bearing device may have a plurality of non-obstruction zones 24A, 24B, 24C, in particular three non-obstruction zones, which are circumferentially spaced apart about the main rotation axis 30. Each non-obstruction zone 24A, 24B, 24C has an inlet 18. Each obstruction zone comprises:
- an inner circumferential section (33A) which extends along a part of the inner bearing gap end,
- an outer circumferential section (33B) which extends along a part of the outer bearing gap end,
- a first radial part (29A) and a second radial part (29B) which extend over a radial distance (Dr) and interconnect the inner circumferential section with the outer circumferential section.

In this embodiment, the non-obstruction zones have the shape of an annulus segment. This embodiment allows individual pressure control in the different non-obstruction zones 24.

Hydrodynamic Bearing

Figure 10A:
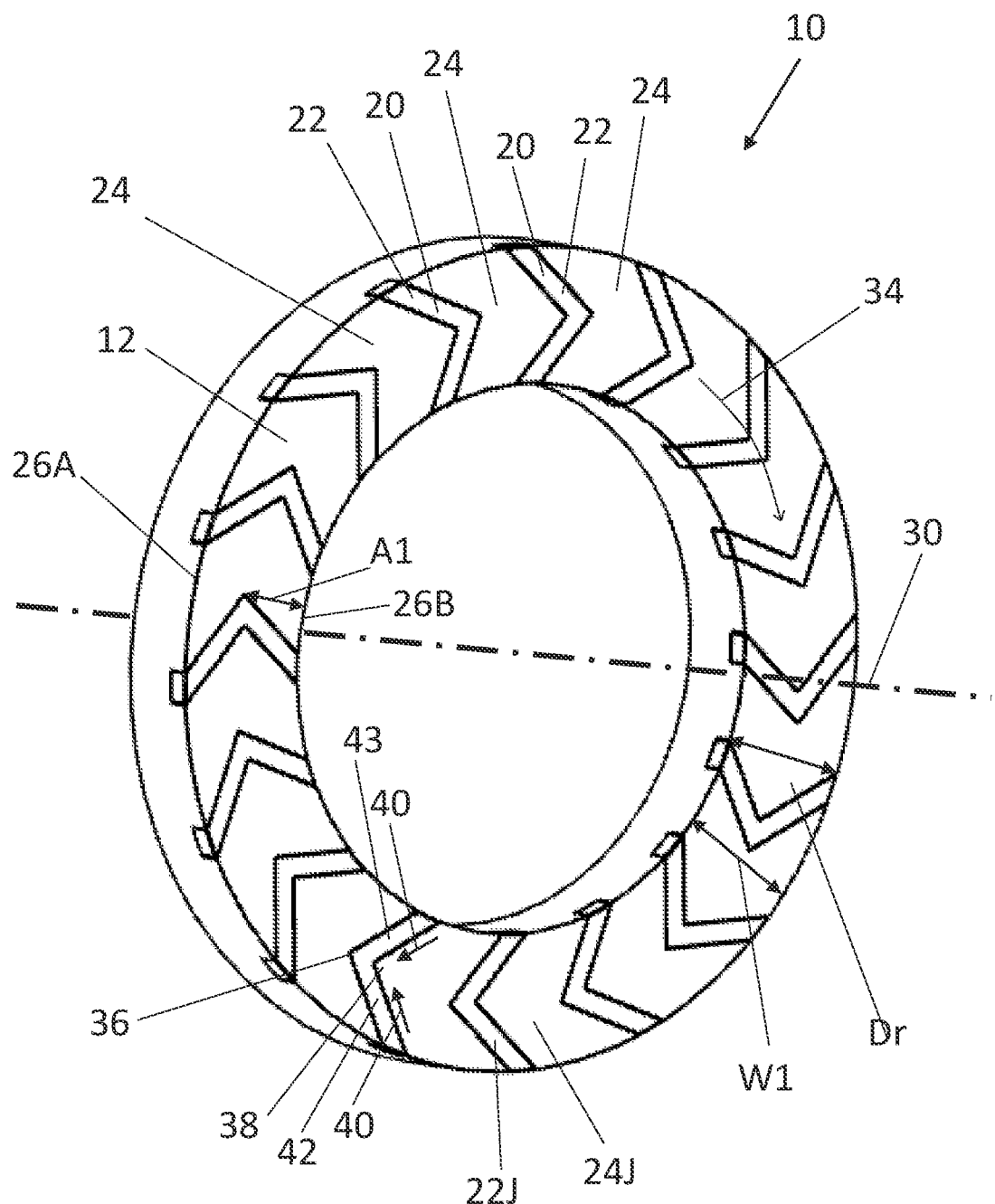
FIG. 10A shows an isometric view of another embodiment of the invention.

Turning to FIG. 10A, another embodiment is shown in which the bearing device is configured as a hydrodynamic bearing device. The bearing device has a first bearing surface 12, and second bearing surface which is not shown to have a better view on the first bearing surface 12. The second bearing surface faces the first bearing surface. The first and second bearing surface are configured to rotate relative to one another about a main rotation axis 30. The first and second bearing surface are flat and annular and extend orthogonal to the main rotation axis 30.

A bearing gap is defined between the first and second bearing surface. The first and second bearing surface are smooth and free of any surface texturing. The bearing gap 16 is free of any abrupt changes in the height of the bearing gap. The bearing gap is filled with a lubricant, wherein the lubricant is a magnetorheological liquid or an electrorheological liquid or a lubricant having a temperature dependent viscosity.

A plurality of activators 20 are embedded in the first (or second) bearing surface 12 and are configured to locally increase a viscosity of the lubricant in a plurality of obstruction zones 22. The effect of this is that a flow of the lubricant through the bearing gap is inhibited in each obstruction zone 22.

The bearing device comprises a plurality of non-obstruction zones 24 in which the flow of the lubricant is not inhibited. In a circumferential direction the obstruction zones and non-obstruction zone are provided in turns, wherein each non-obstruction zone 24 is located between two obstruction zones 22.

The effect of an obstruction zone is noticeable in the non-obstruction zone 24 which is upstream of the obstruction zone when considering the flow direction 34 (indicated with an arrow) of the lubricant relative to the obstruction zones 22. For instance the effect of obstruction zone 22J is felt in the non-obstruction zone 24J which is located upstream of the obstruction zone 22J.

Each obstruction zone has a curved or angular shape. Each obstruction zone extends over a radial distance Dr which may be equal to a width W1 of the annular first or second surface.

In case of an angular shape, the herringbone pattern shown in FIG. 10A is found to be advantageous. Herringbone patterns are known from hydrodynamic bearings having surface texturing in the form of grooves. In these bearings, the herringbone patter is made with surface texturing. This requires very precise machining. The resulting bearing very sensitive to wear and tear. Damage in the surface texturing as a result of contact between the first and second surface can easily result in malfunctioning of the bearing device. The present invention provides significant advantages in this respect.

The curved or angular shape defines a top 36 which is directed downstream. The obstruction zone is configured to cause, when the first and second surfaces move relative to one another, a local rise of a pressure of the lubricant within the bearing gap in the non-obstruction zone 24 which is located upstream of each obstruction zone and in particular in a peak zone 38 of each obstruction zone 24 which is located directly upstream of each top 36 by locally increasing the viscosity in the obstruction zone and inhibiting the flow of the lubricant across each obstruction zone.

Because of the curved or angular shape of the obstruction zones 24, the lubricant will be urged in a radial direction toward the peak zone, as indicated by arrows 40 in FIG. 9. The left side 42 and the right side 43 of the obstruction zone 22 urge the lubricant towards the peak zone. More in particular the flow of the lubricant will contract somewhat in the peak zones 38, resulting in a higher dynamic pressure of the lubricant in the peak zones 38. Obviously a curved shape also works. In another embodiment, the top 36 may be open resulting in a separate left side 42 of the construction zone and a separate right side 43 of the construction zone. The left and right side may even be staggered. This is still considered an angular shape because the left side of the obstruction zone is angled relative to the right side and also angled relative to a radial direction.

Each top 36 is located in a central region of the first surface 12, wherein the tops 38 are in particular located at a distance (A1) from an inner bearing end 26B, wherein the distance (A1) is 30-70 percent, more in particular 40-60 percent of a width (W1) of the first surface 12 or second surface.

The obstruction zones may have a V-shape (herringbone arrangement) as shown in FIG. 9 or alternatively may have a U-shape.

Turning to FIG. 10B, a linear variant of the hydrodynamic bearing device 10 is shown. The linear variant works in substantially the same way as the annular variant of FIG. 10A.

Figure 11:
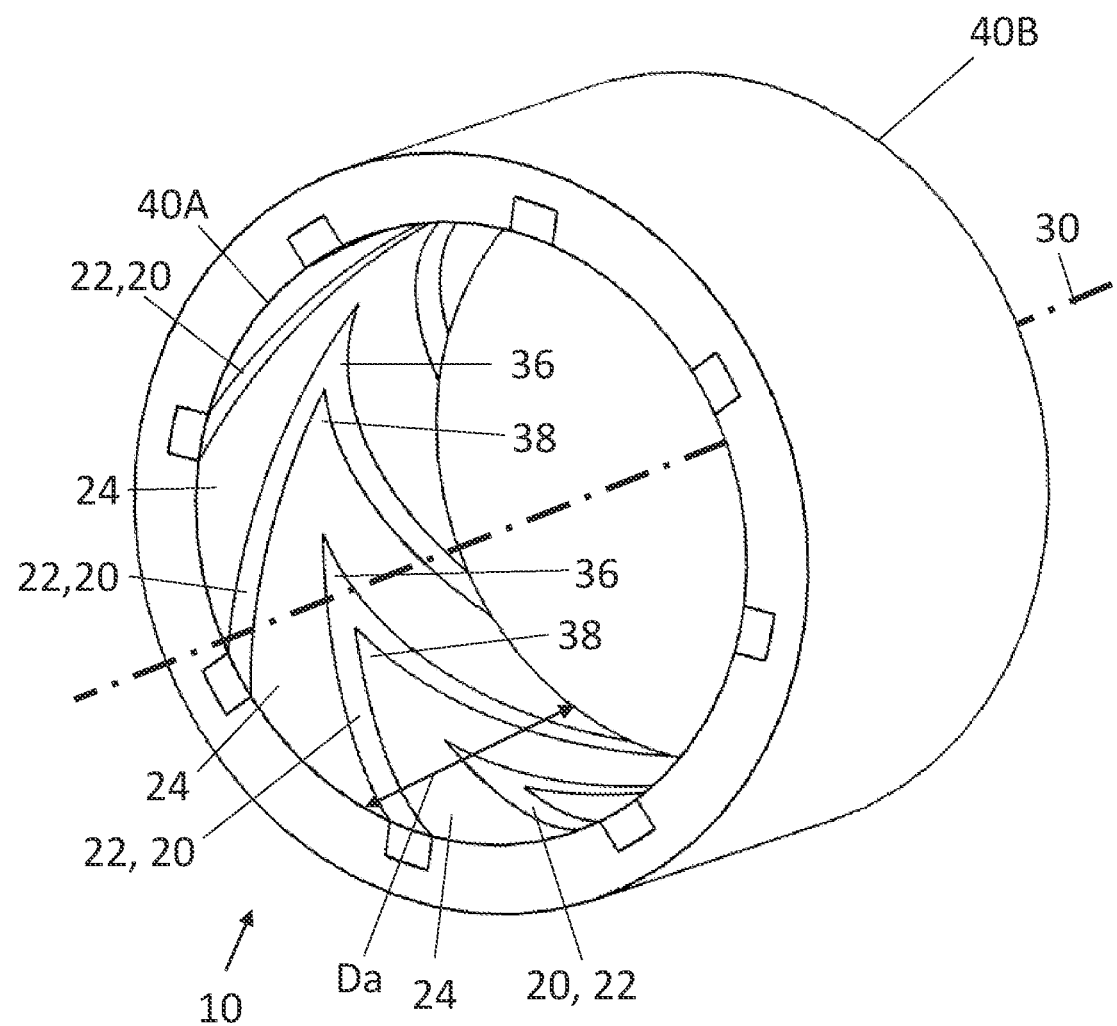
FIG. 11 shows an isometric view of another embodiment of the invention.

Turning to FIG. 11, a hydrodynamic journal bearing is shown in which the obstruction zones 22 which are defined by the activators 20 are spaced about the circumference of the first or second surface and extend over an axial distance (Da) in the direction of the main axis 30. The obstruction zones are curved or angular. In case of a curved shape, the curvature may be a catenary, parabolic shape a general U-shape or a different curvature. In case of an angular shape, the obstruction zones may have a single angled top (a V-shape) or have multiple angles, for instance three angles (or corners), one central angle which defines the top and a left and right angle.

Figure 12:
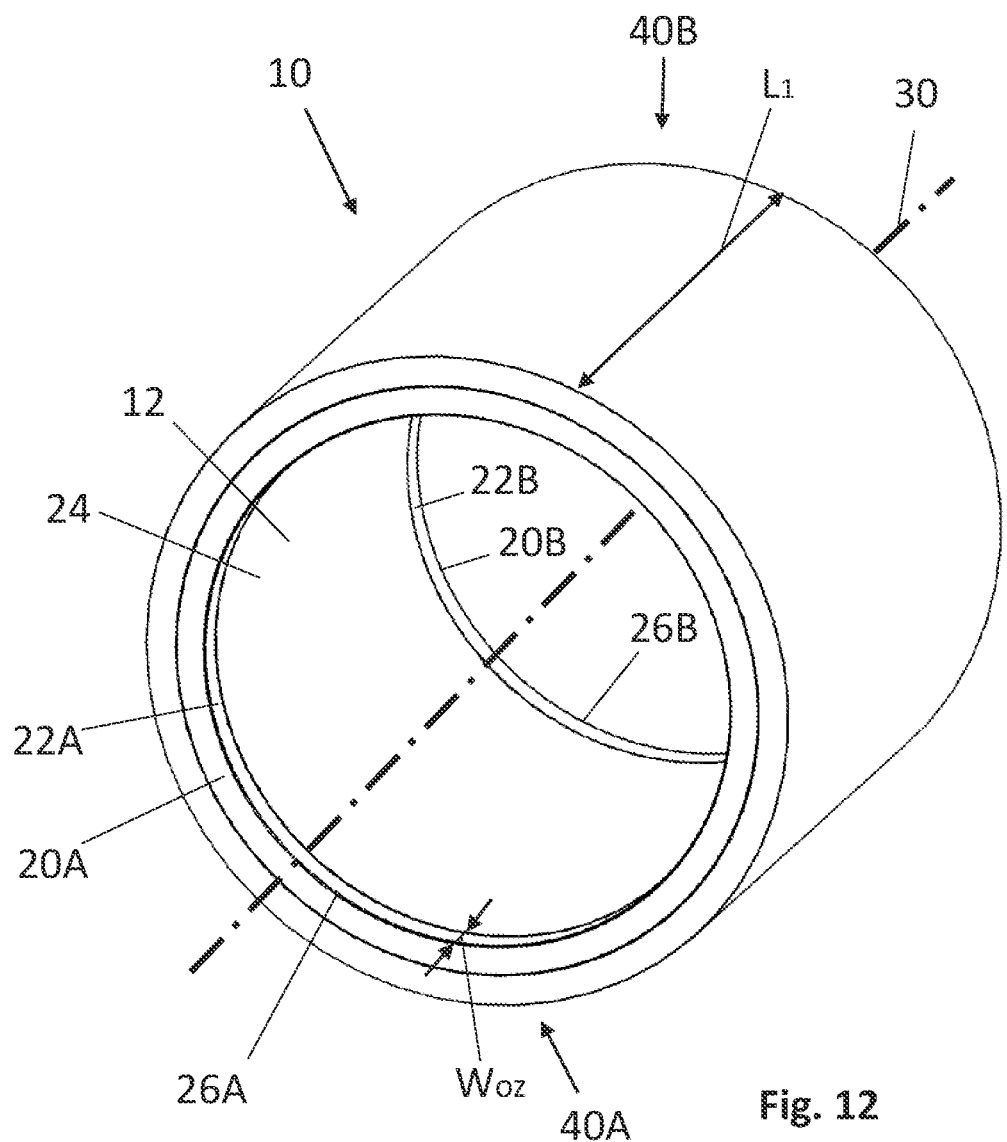
FIG. 12 shows an isometric view of yet another embodiment of the invention.

Turning to FIG. 12, another embodiment of the invention is shown, which is a hydrodynamic journal bearing device 10. The bearing device comprises a cylindrical bearing member 13 having a first surface 12 which faces inwardly and extends around a shaft. The shaft comprising a second surface which faces outwardly. The shaft is not shown in FIG. 12 in order to more clearly show the first surface 12.

The hydrodynamic journal bearing device has a bearing length (L1). The bearing device has a bearing gap and has a first bearing gap end 26A and an opposite second bearing gap end 26B. The first bearing gap end 26A and the second bearing gap end 26B are located at opposite first and second bearing ends 40A, 40B.

The bearing gap exists between the inward facing first bearing surface and the outward facing second surface. The first surface 12 and the second surface are smooth and continuous. The bearing gap is filled with a lubricant. The lubricant is a magnetorheological liquid or a electrorheological liquid or a lubricant having a temperature dependent viscosity.

At least a first activator 20A and a second activator 20B are embedded in the first or second surface and are configured to locally increase a viscosity of the lubricant in a first and second obstruction zone 22A,22B in the bearing gap. When activated the first and second activator increase the viscosity of the lubricant in the first and second obstruction zone and inhibit the lubricant from flowing across the first and second obstruction zone.

The first surface 12 and the second surface are free of surface texturing in the form of a land and pad and are smooth and continuous and are without any abrupt changes in the height of the bearing gap. The bearing gap comprises at least one non-obstruction zone 24 in which the flow of lubricant is not inhibited, The first and second bearing gap end 26A, 26B are annular and extend around the shaft and extend in a plane which is orthogonal to the longitudinal bearing axis 30.

The first and second obstruction zones 22A, 22B are ring-shaped and are located at the opposite ends 40A, 40B of the journal bearing. The non-obstruction zone 24 is located between the first and second obstruction zone 22A, 22B.

The first obstruction zone 22A inhibits the lubricant from reaching the first bearing gap end 26A and the second obstruction zone 22B inhibits the lubricant from reaching the second bearing gap end 26B. The first obstruction zone 22A and the second obstruction zone 22B together inhibit the lubricant from flowing out of the non-obstruction zone 24 and flowing out of the bearing gap through the bearing gap ends 26A, 26B.

As in most hydrodynamic journal bearings, a height of the bearing gap may vary in a circumferential direction. If the axle is aligned with the cylindrical bearing member 13, a height of the bearing gap will be constant in an axial direction. However in practice a small misalignments may occur as a result of the loads on the axis.

The bearing has a length L1 each obstruction zones has a width Woz. The width Woz of each obstruction zone is less than 10 percent of the length L1 of the bearing. This results in the non-obstruction zone 24 forming at least 80 percent of the length of the bearing.

Figure 13A:
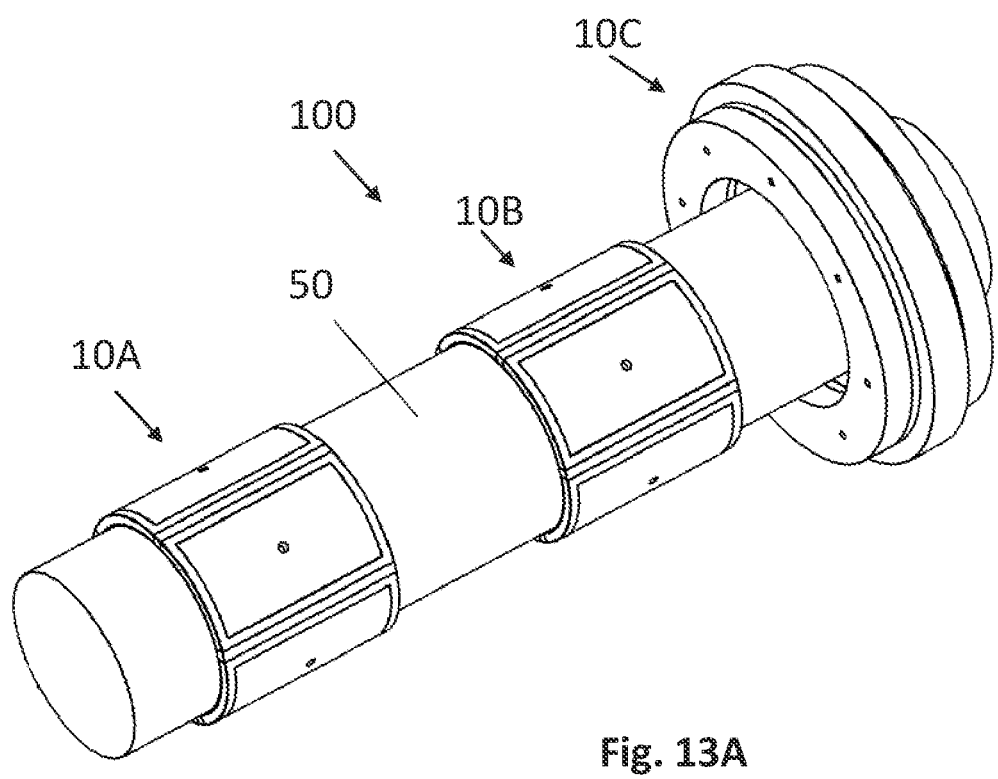
FIG. 13A shows an isometric view of a drive assembly having three bearing devices according to the present invention.

Turning to FIG. 13A a drive assembly 100 is shown which comprise a shaft 50, wherein the shaft is supported by at least one bearing device 10, and in particular three bearing devices 10 according to the invention.

The shaft is supported by a first journal bearing device 10A and a second journal bearing device 10B, the first and second bearing device being a journal bearing device and providing support in a radial direction Y,Z, and a third, thrust bearing device 100 providing support in an axial direction X.

The drive assembly may be used in various applications.

Figure 13B:
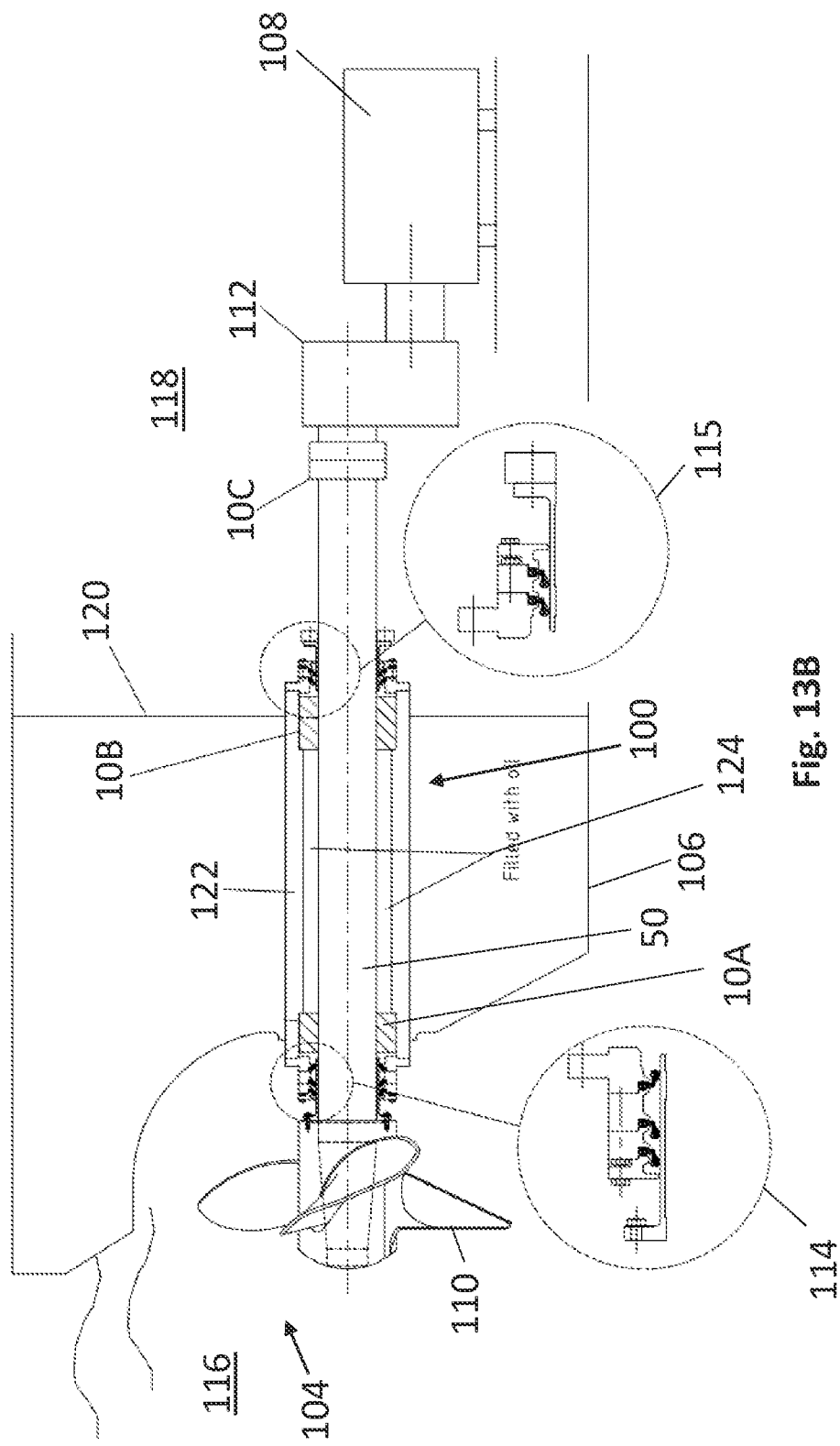
FIG. 13B shows an isometric view of a vessel comprising a drive assembly having three bearing devices according to the present invention.

Turning to FIG. 13B, in one application, the drive assembly 100 is used on board a vessel 104, the vessel comprising a hull 106, an engine 108, a propeller 110, and the drive assembly 100 which connects the engine with the propeller.

The shaft is supported by the first journal bearing device 10A, the second journal bearing device 10B, the first and second journal bearing device providing support in two independent radial directions Y,Z, and by the third thrust bearing device providing support in an axial direction X.

The engine further comprises a gear box 112, an outboard seal 114, an inboard seal 115. The seals 114, 115 prevent ingress of seawater 116. The engine 108 and the gear box 112 are positioned in an engine room 118, which may be separated from the rest of the inner volume of the vessel by one or more bullheads 120. The shaft 50 is generally located within a stern tube 122. The annular space 124 between the stern tube 122 and the shaft 50 may be filled with oil.

Further Embodiment

Figure 16:
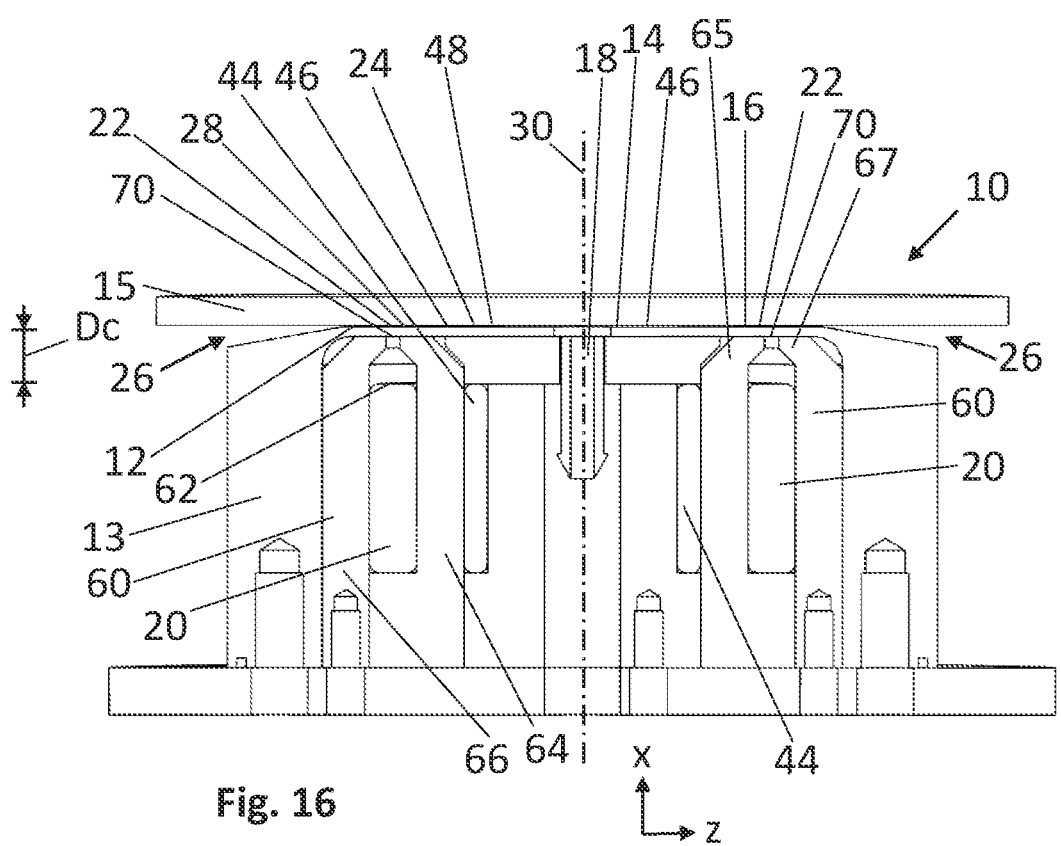
FIG. 16 shows a sectional side view of another embodiment of the invention.
Figure 17:
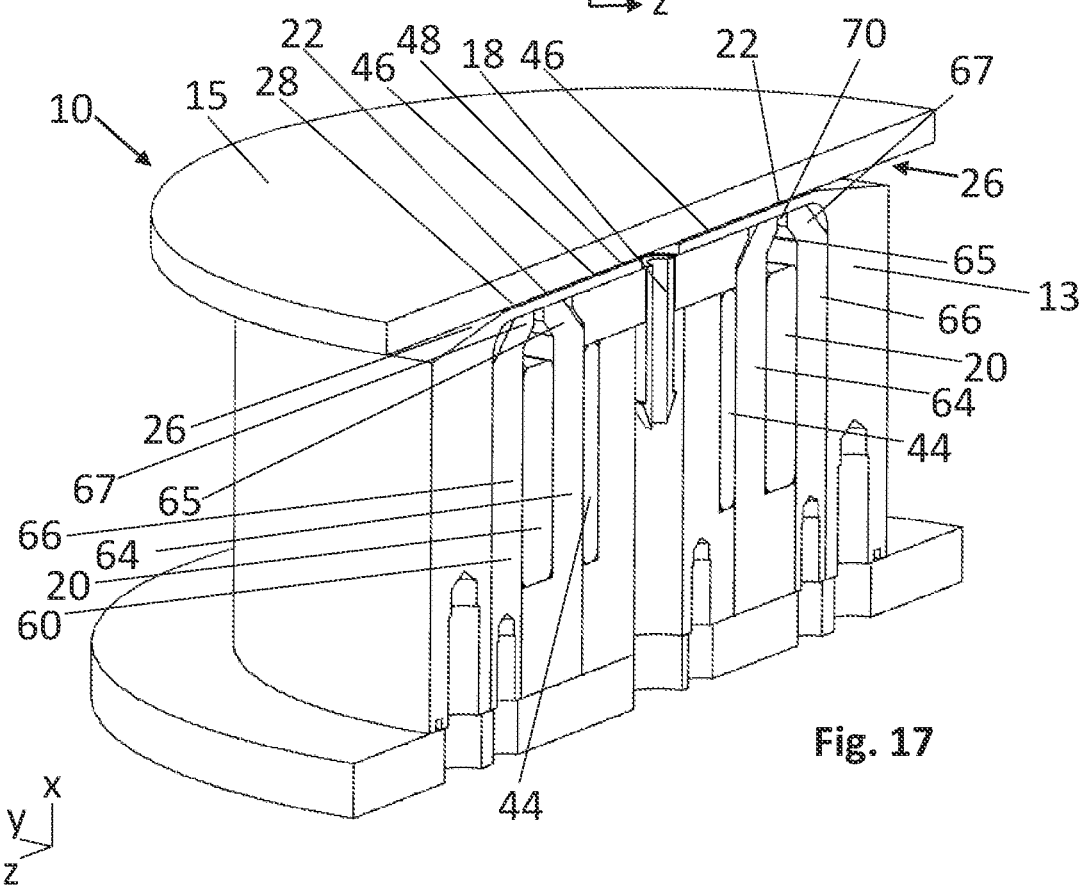
FIG. 17 shows an isometric view of the embodiment of FIG. 16.

Turning to FIGS. 16 and 17, another embodiment is shown. The one or more activators 20 are called primary activators. The bearing device further comprises one or more anti-activators 44 which are electromagnets or permanent magnets or electric activators or heating elements. The anti-activators create an opposed magnetic or electric field for cancelling out the magnetic or electric field created by the primary activators 20 in at least a part of the non-obstruction zone 24 or for heating the lubricant in the non-obstruction zone or in at least a part of the non-obstruction zone.

In this embodiment, the primary activator 20 is a coil which extends around the inlet 18. The coil has a main axis 30. The anti-activator 44 also is a coil which extends around the inlet 18, the coil having a same main axis 30. When viewed in the X-direction (which extends parallel to the axes 30 of the coils), the primary activator 20 and the anti-activator 44 form concentric circles.

The anti-actuators 44 have effect in a part of the non-obstruction zone, wherein said part is called an anti-obstruction zone 46. The non-obstruction zone 24 further comprises a non-influence zone 48 which is not under the influence of the primary activators or anti-activators, wherein at least one anti-obstruction zone is located adjacent an obstruction zone and between said obstruction and a non-influence zone.

The activators 20 are electromagnets The bearing device further comprises at least one passive ferromagnetic member 60 configured for increasing the electromagnetic field.

The coils 20, 44 are located underneath the first surface 12 and underneath a layer of material 28. An end 62 of said coil is located at a distance (Dc) from the first surface 12 underneath which the coil is located. The at least one ferromagnetic member comprises an inner member 64 located within the coil and an outer member 66 located outside the coil. The inner and outer member 64, 66 comprise respectively an inner projection 65 and an outer projection 67 which extend beyond the end 62 of the coil towards said first surface 12, An opening 70 is provided between said inner and outer projection. The area in the bearing gap 16 above said opening 70 is the obstruction area 22. The at least one obstruction zone 22 fully surrounds the at least one non-obstruction zone 24.

Embodiment with Obstruction Zone within Non-Obstruction Zone

Figure 18:
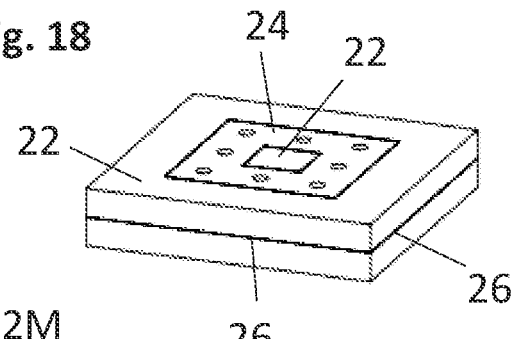
FIG. 18 shows an isometric view of another embodiment of the invention.
Figure 19:
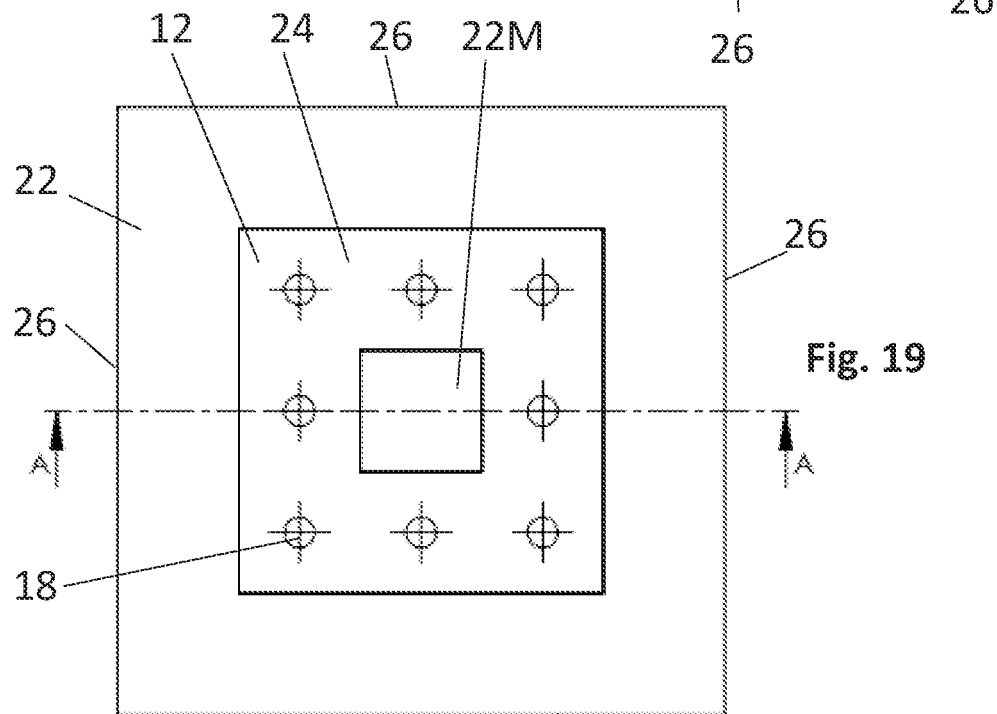
FIG. 19 shows a top view of the embodiment of FIG. 18.
Figure 20:
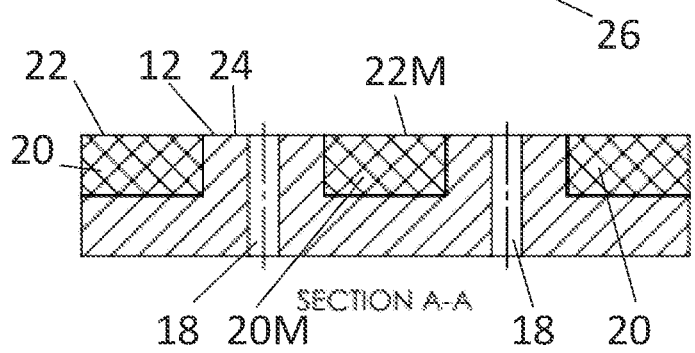
FIG. 20 shows a sectional side view of the embodiment of FIG. 18.

Turning to FIGS. 18, 29 and 20, an embodiment of a hydrostatic bearing device according to the invention is shown having a non-obstruction zone 24 which encloses an inner obstruction zone 22M. The non-obstruction zone 24 is also enclosed by an outer, annular obstruction zone 22.

The inner obstruction zone 22M has a beneficial effect of damping of possible vibrations (or resonance) of two bearing surfaces moving relative to one another in a direction orthogonal to the first surface 12. When the bearing surfaces move toward one another, a so called "squeeze flow" is created. The squeeze flow is a flow of lubricant from the inner obstruction zone 22M to the non-obstruction zone 24 and from the non-obstruction zone 24 through the obstruction zone 22 to the bearing gap end 26 and out of the bearing gap.

The squeeze flow in itself is known in the field of bearing devices. However, with this embodiment, the lubricant in the bearing gap at the central obstruction zone 22M has an increased viscosity (or increased slip angle). As a result the squeeze flow will be obstructed and less lubricant will be squeezed out of the bearing gap. As a result better damping of the vibration or resonance will occur.

Turning to FIGS. 21,22, 23 an embodiment of a hydrodynamic bearing device with tilting pads 80 is shown. Bearing devices with tilting pads are known. The tilting pad is connected to an outer part of the bearing device via a hinge 82 which defines a pivot axis 84. It is conceivable that a tilting pad can pivot about two pivot axes which extend at right angles to one another, for instance via a spherical hinge.

In this embodiment, the direction of flow of the lubricant relative to the first surface 12 is indicated with arrow 34. The shape of the obstruction zone 22 is the same as discussed for the embodiment of FIGS. 10A, 10B and 11 with a difference that tilting pads are generally square or rectangular. The obstruction zone 22 of the tilting pad may have a U-shape. The U-shaped obstruction zone extends along three sides 88 of the tilting pad. The obstruction zone may also have an angular form such as a V-shape or may have a curved form. There may also be multiple obstruction zones side by side on a single tilting pad.

The arrow 34 not only indicates the direction of flow of the lubricant relative to the first surface, but also indicates the direction of movement of the second surface relative to the first surface.

The obstruction zone 22 has a top 36 which is "bottom" of the U-shape. Directly upstream of the top 36, a peak zone 38 is formed in the non-obstruction zone. In the peak zone 38, the pressure of the lubricant reaches a maximum.

Although only one tilting pad 80 is shown, it will be clear that in a complete bearing device, there will be a plurality of tilting pads spaced about the axis of rotation. For instance there may be 3, 4, 6 or 8 tilting pads, but a different number is also possible. The first surface 12 of the tilting pad may be flat but may also be curved, in particular concave, as is known for tilting pads.

In case of a thrust bearing, the tilting pads may also have the shape of a part of a ring shape. Together, the tilting pads form the ring shape.

The skilled person will understand that between two adjoining tilting pads there is generally a non-supporting zone (or non-supporting gap). For the purpose of this document, these non-supporting zones are not considered part of the bearing gap. The feature evenness of the first and second surface applies to the individual first surface sections of the tilting pads. The feature of "free of any surface texturing" and "free of any abrupt changes in the height of the bearing gap" also applies to the individual sections formed by the tilting pads.

The tilting pads need not be exactly square or rectangular. A trapezoid shape is also possible. The tilting pads 80 may have rounded corners.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The invention claimed is:

1. A hydrodynamic bearing device, comprising:
    a first bearing surface,
    a second bearing surface which faces the first bearing surface, wherein the first and second bearing surface are configured to rotate relative to one another about a main rotation axis,
    a bearing gap defined between the first and second bearing surface, wherein the first and second bearing surface are smooth and free of any surface texturing, the bearing gap being free of any abrupt changes in the height of the bearing gap, the bearing gap being filled with a lubricant, wherein the lubricant is a magneto-rheological liquid or a lubricant having a controllable slip velocity,
    a plurality of activators embedded in the first or second bearing surface and configured to locally increase a viscosity of the lubricant or locally decrease the slip velocity in a plurality of obstruction zones, thereby inhibiting a flow of the lubricant through the bearing gap in each obstruction zone, and
    a plurality of non-obstruction zones in which the flow of the lubricant is not inhibited, wherein in a direction of relative movement between the first and second bearing surface the obstruction zones and non-obstruction zone are provided in turns, each non-obstruction zone being located upstream of an associated obstruction zone,
    wherein each obstruction zone has a curved or angular shape, wherein the curved or angular shape defines a top being directed downstream, wherein the obstruction zone is configured to cause, when the first and second surfaces move relative to one another, a local rise of a pressure of the lubricant within the bearing gap in the non-obstruction zone which is located upstream of each obstruction zone and in particular in a peak zone which is located directly upstream of each top by locally increasing the viscosity or locally decreasing the slip velocity in the obstruction zone and inhibiting the flow of the lubricant across each obstruction zone.

2. The hydrodynamic bearing device according to claim 1, wherein each obstruction zone comprises a left section and a right section which extend at an angle to a radial direction, wherein the left and right section direct the lubricant towards the peak zone.

3. The hydrodynamic bearing device according to claim 1, wherein each top is located in a central region of the first or second surface, wherein the tops are in particular located at a distance from an inner bearing end of the first or second surface, wherein the distance is 30-70 percent of a width of the first or second surface.

4. The hydrodynamic bearing device according to claim 1, being a thrust bearing device, wherein the first and second surface are flat and extend orthogonal to said main rotation axis, wherein the obstruction zones extend over a radial distance.

5. The hydrodynamic bearing device according to claim 1, wherein the first and second surface are annular and wherein the bearing gap is annular.

6. The hydrodynamic bearing device according to claim 1, wherein the obstructions zones have a V-shape or a U-shape.

7. The hydrodynamic bearing device according to claim 1, wherein the bearing device is a tilting pad bearing device and comprises a plurality of tilting pads which are tiltable, wherein the first surface comprises a plurality of first surface sections, each first surface section being associated with a tilting pad, and wherein the bearing gap comprises a plurality of bearing gap sections, each bearing gap section associated with a tilting pad,
    wherein each first surface section is smooth and free of any surface texturing, and each individual bearing gap section between a tilting pad and the opposed second surface is free of any abrupt changes in the height of the bearing gap,
    wherein each first surface section comprises an obstruction zone having a curved or angular shape, wherein the curved or angular shape defines a top being directed downstream, wherein the obstruction zone is configured to cause, when the first and second surfaces move relative to one another, a local rise of a pressure of the lubricant within the bearing gap in the non-obstruction zone which is located upstream of each obstruction zone and in particular in a peak zone which is located directly upstream of each top by locally increasing the viscosity or locally decreasing the slip velocity in the obstruction zone and inhibiting the flow of the lubricant across each obstruction zone.

8. A drive assembly, comprising:
a shaft, wherein the shaft is supported by at least one bearing device according to claim 1.

9. The drive assembly according to claim 8, wherein the at least one bearing device further comprises a first bearing device, a second bearing device, and a third bearing device, wherein the shaft is supported by the first and second bearing devices as journal bearings, the first and second journal bearing devices positioning the shaft and providing support for the shaft in two independent radial directions, and the third device is a thrust bearing, the third thrust bearing device positioning the shaft and providing support for the shaft in an axial direction.

10. A vessel, comprising:
a hull, an engine, a propeller, and a drive assembly of claim 8 which connects the engine with the propeller.

11. A bearing device, comprising:
a first surface and a second surface which are moveable relative to one another and which face one another, wherein the first surface and second surface are separated by a bearing gap filled with a lubricant, wherein the lubricant is a magnetorheological liquid or a lubricant having a controllable slip velocity,
one or more supply inlets in the first or second surface, each supply inlet configured to supply the lubricant from a pressurized liquid source to the bearing gap, and
one or more activators embedded in the first or second surface and configured to locally increase the viscosity of the lubricant or locally decrease the slip velocity of the lubricant in at least one obstruction zone in the bearing gap, thereby locally inhibiting a flow of the lubricant through the bearing gap in the obstruction zone,
wherein the bearing gap comprises at least one non-obstruction zone in which the flow of the lubricant is not inhibited, wherein each non-obstruction zone surrounds the associated supply inlet,
wherein a flow path of the lubricant through the bearing gap is defined, which flow path starts at the at least one supply inlet, extends along the at least one non-obstruction zone, traverses the obstruction zone and ends at a bearing gap end,
wherein the first surface and the second surface are free of surface texturing, in particular in the form of a land and pad, and are smooth and continuous and are without any abrupt changes in a height of the bearing gap,
wherein the at least one obstruction zone either by itself or in cooperation with other obstruction zones encloses the at least one non-obstruction zone,
wherein the lubricant having an increased viscosity or decreased slip velocity in the obstruction zone acts as an obstruction of the flow path and either by itself or in cooperation with lubricant with increased viscosity or decreased slip velocity in other obstruction zones inhibits the lubricant from flowing out of the non-obstruction zone and flowing out of the bearing gap through the bearing gap end, thereby increasing a pressure of the lubricant in the non-obstruction zone to a level which is sufficient to carry a load on the bearing device while preventing contact between the first and second surface.

12. The bearing device according to claim 11, wherein the activators are electromagnets or permanent magnets which create a magnetic field or are electric activators which can be electrically charged to create an electric field in the at least one obstruction zone.

13. The bearing device according to claim 11, comprising a plurality of non-obstruction zones, in particular three non obstruction zones, each non-obstruction zone having a respective inlet, and a plurality of obstructions zones wherein each obstruction zone surrounds a non-obstruction zone with which it is associated and inhibits the lubricant from flowing out of the associated non-obstruction zone.

14. The bearing device according to claim 11, wherein the first and second surfaces are cylindrical or conical, the bearing device comprising multiple non-obstruction zones, each non-obstruction zone being surrounded by an obstruction zone, wherein each obstruction zone comprises a first axial part and a second axial part which extend over an axial distance, and a first circumferential part and a second circumferential part which extend over a circumferential distance, each obstruction zone comprising four corners which interconnect the first and second axial part and the first and second circumferential part.

15. A hydrodynamic bearing device, comprising:
a first bearing surface, and
a second bearing surface which faces the first bearing surface, wherein the first and second bearing surface are configured to rotate relative to one another about a main rotation axis,
a bearing gap defined between the first and second bearing surface, the bearing gap being filled with a lubricant, wherein the lubricant is a magnetorheological liquid or a lubricant having a controllable slip velocity,
a plurality of activators embedded in the first or second bearing surface and configured to locally increase a viscosity of the lubricant or locally decrease the slip velocity in a plurality of obstruction zones, thereby inhibiting a flow of the lubricant through the bearing gap in each obstruction zone, and
a plurality of non-obstruction zones in which the flow of the lubricant is not inhibited, wherein in a direction of relative movement between the first and second bearing surface the obstruction zones and non-obstruction zone are provided in turns, each non-obstruction zone being located upstream of an associated obstruction zone,
wherein each obstruction zone has a curved or angular shape, wherein the curved or angular shape defines a top being directed downstream, wherein the obstruction zone is configured to cause, when the first and second surfaces move relative to one another, a local rise of a pressure of the lubricant within the bearing gap in the non-obstruction zone which is located upstream of each obstruction zone and in particular in a peak zone which is located directly upstream of each top by locally increasing the viscosity or locally decreasing the slip velocity in the obstruction zone and inhibiting the flow of the lubricant across each obstruction zone,
wherein the bearing device is a tilting pad bearing device and comprises a plurality of tilting pads which are tiltable, wherein the first surface comprises a plurality of first surface sections, each first surface section being associated with a tilting pad, and wherein the bearing gap comprises a plurality of bearing gap sections, each bearing gap section associated with a tilting pad, wherein each first surface section is smooth and free of any surface texturing, and each individual bearing gap section between a tilting pad and the opposed second surface is free of any abrupt changes in the height of the bearing gap, wherein each first surface section comprises an obstruction zone having a curved or angular shape, wherein the curved or angular shape defines a top being directed downstream, wherein the obstruction zone is configured to cause, when the first and second surfaces move relative to one another, a local rise of a pressure of the lubricant within the bearing gap in the non-obstruction zone which is located upstream of each obstruction zone and in particular in a peak zone which is located directly upstream of each top by locally increasing the viscosity or locally decreasing the slip velocity in the obstruction zone and inhibiting the flow of the lubricant across each obstruction zone.

* * * * *